(12) United States Patent
Fukushi et al.

(10) Patent No.: US 9,212,279 B2
(45) Date of Patent: Dec. 15, 2015

(54) MICROEMULSIONS AND FLUOROPOLYMERS MADE USING MICROEMULSIONS

(75) Inventors: Tatsuo Fukushi, Woodbury, MN (US); Gregg D. Dahlke, Saint Paul, MN (US); Denis Duchesne, Woodbury, MN (US); Werner M.A. Grootaert, Oakdale, MN (US); Miguel A. Guerra, Woodbury, MN (US); Larry A. Last, Moulton, AL (US); Peter J. Scott, Madison, AL (US); Zai-Ming Qiu, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 151 days.

(21) Appl. No.: 13/994,900

(22) PCT Filed: Dec. 13, 2011

(86) PCT No.: PCT/US2011/064571
§ 371 (c)(1),
(2), (4) Date: Sep. 16, 2013

(87) PCT Pub. No.: WO2012/082707
PCT Pub. Date: Jun. 21, 2012

(65) Prior Publication Data
US 2014/0005333 A1 Jan. 2, 2014

Related U.S. Application Data

(60) Provisional application No. 61/424,330, filed on Dec. 17, 2010.

(51) Int. Cl.
*C08L 27/20* (2006.01)
*C08F 14/18* (2006.01)
*C08F 214/18* (2006.01)

(52) U.S. Cl.
CPC .............. *C08L 27/20* (2013.01); *C08F 14/18* (2013.01); *C08F 214/18* (2013.01)

(58) Field of Classification Search
CPC ........................................................ C08L 27/20
USPC ........................................................... 524/805
See application file for complete search history.

(56) References Cited

U.S. PATENT DOCUMENTS

| | | | | |
|---|---|---|---|---|
| 4,544,458 A | * | 10/1985 | Grot et al. | 205/521 |
| 4,864,006 A | * | 9/1989 | Giannetti et al. | 526/209 |
| 4,940,525 A | * | 7/1990 | Ezzell et al. | 204/252 |
| 4,990,283 A | * | 2/1991 | Visca et al. | 516/30 |
| 5,234,807 A | * | 8/1993 | Texter et al. | 430/627 |
| 5,378,782 A | * | 1/1995 | Grootaert | 526/255 |
| 5,698,138 A | * | 12/1997 | Visca et al. | 516/22 |
| 6,943,228 B2 | * | 9/2005 | Grootaert et al. | 526/217 |
| 7,094,839 B2 | * | 8/2006 | Grootaert et al. | 525/326.2 |
| 8,541,499 B2 | * | 9/2013 | Hintzer et al. | 524/546 |
| 2004/0024134 A1 | * | 2/2004 | Grootaert et al. | 525/326.2 |
| 2004/0167290 A1 | * | 8/2004 | Grootaert et al. | 525/326.2 |
| 2004/0254319 A1 | * | 12/2004 | Ameduri et al. | 526/249 |
| 2008/0015304 A1 | * | 1/2008 | Hintzer et al. | 524/544 |
| 2009/0124754 A1 | * | 5/2009 | Coughlin et al. | 524/746 |
| 2009/0124755 A1 | * | 5/2009 | Coughlin et al. | 524/746 |
| 2009/0186969 A1 | * | 7/2009 | Coughlin et al. | 524/148 |
| 2013/0267658 A1 | * | 10/2013 | Guerra et al. | 524/609 |
| 2013/0274498 A1 | * | 10/2013 | Guerra et al. | 558/61 |
| 2014/0005333 A1 | * | 1/2014 | Fukushi et al. | 524/805 |

FOREIGN PATENT DOCUMENTS

| | | |
|---|---|---|
| CN | 101 186 669 A | 5/2008 |
| CN | 101693751 | 4/2010 |
| EP | 1 602 687 A1 | 12/2005 |
| WO | WO 99/48939 A1 | 9/1999 |
| WO | WO 00/35571 A1 | 6/2000 |
| WO | WO 2008/060460 A1 | 5/2008 |

* cited by examiner

*Primary Examiner* — Michael Pepitone
*Assistant Examiner* — Michael A Salvitti
(74) *Attorney, Agent, or Firm* — C. Michael Geise

(57) ABSTRACT

There are provided microemulsions derived from compositions containing oligomeric fluorosulfinic compounds and/or ethylenically unsaturated, polymerizable monomeric fluorosulfinic compounds and to their uses in (co)polymerization processes in aqueous emulsion of fluorinated monomers.

12 Claims, No Drawings

MICROEMULSIONS AND FLUOROPOLYMERS MADE USING MICROEMULSIONS

FIELD OF THE DESCRIPTION

The present description relates to microemulsions derived from compositions containing oligomeric fluorosulfinic compounds and/or ethylenically unsaturated, polymerizable monomeric fluorosulfinic compounds and to their uses in (co)polymerization processes in aqueous emulsion of fluorinated monomers.

BACKGROUND OF THE INVENTION

Fluoropolymers, i.e. polymers having a fluorinated backbone, have been long known and have been used in a variety of applications because of several desirable properties such as heat resistance, chemical resistance, weatherability, UV-stability etc. The various fluoropolymers are for example described in "Modern Fluoropolymers", edited by John Scheirs, Wiley Science 1997. Commonly known or commercially employed fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, hexafluoropropylene and vinylidene fluoride (VDF) (so called THV copolymers) and polyvinylidene fluoride polymers (PVDF). Commercially employed fluoropolymers also include fluoroelastomers and thermoplastic fluoropolymers.

Several methods are known to produce fluoropolymers. Such methods include suspension polymerization, aqueous emulsion polymerization, solution polymerization, polymerization using supercritical $CO_2$, and polymerization in the gas phase. In the polymerization of fluoromonomers, traditionally the monomers are added to a kettle along with an initiator, to initiate the polymerization, as well as a solvent, and in the case of aqueous emulsion polymerization, the polymerization is carried out in water and typically in the presence of a surfactant, in order to stabilize the emulsion.

Aqueous emulsion polymerization normally involves the polymerization in the presence of a fluorinated surfactant, which is generally used for the stabilization of the polymer particles formed. Suspension polymerization generally does not involve the use of surfactant but results in substantially larger polymer particles than in case of the aqueous emulsion polymerization. Thus, the polymer particles in case of suspension polymerization will quickly settle out whereas in case of dispersions obtained in emulsion polymerization generally good stability over a long period of time is obtained. It is generally recognized that an aqueous emulsion polymerization where no surfactant is used to generally produce homo- and copolymers of chlorotrifluoroethylene (CTFE).

Notwithstanding the fact that emulsifier free polymerizations are known, the aqueous emulsion polymerization process in the presence of surfactants is still a desirable process to produce fluoropolymers because it can yield stable fluoropolymer particle dispersions in high yield. Emulsion polymerization processes have been carried out using various fluorinated surfactants, such as, for example, perfluoroalkanoic acid or salt thereof as a surfactant. Perfluoroalkanoic acid or salt thereof were the preferred surfactants because they provided a wide variety of desirable properties such as high speed of polymerization, good copolymerization properties of fluorinated olefins with comonomers, small particle sizes of the resulting dispersion can be achieved, good polymerization yields i.e. a high amount of solids can be produced, good dispersion stability, etc. Due to environmental concerns, however, perfluoroalkanoic acid or salt thereof was recently replaced with other fluorinated surfactants, such as, for example linear and branched partially or perfluorinated polyethers. In order to achieve product characteristics similar to those achieved when using perfluoroalkanoic acid or salt thereof, however, the aforementioned fluorinated emulsifiers must be used in higher quantities than perfluoroalkanoic acid or salt thereof and generally require the addition of an inert perfluorochemical during aqueous emulsion polymerization of the fluoromonomers.

There is needed a more effective surfactant that can increase polymerization rates and be effective at even lower levels, which would save production costs, such as, for example on surfactant recovery systems. There is also a need for a surfactant that does not require addition of an inert fluorochemical during aqueous emulsion polymerization of the fluoromonomers. There is also a need for a surfactant that become part of the resulting fluoropolymer, which would eliminate the need for surfactant recovery and recycle equipment and processes.

SUMMARY OF THE INVENTION

The present disclosure provides microemulsions obtained by mixing water, at least one ethylenically unsaturated fluoromonomer, and at least one oligomeric fluorosulfinic compound and/or at least one ethylenically unsaturated, polymerizable monomeric fluorosulfinic compounds. The present disclosure also provides the use of such microemulsions for polymerization of the at least one ethylenically unsaturated fluorinated monomers while obtaining high speed of polymerization, good copolymerization properties of fluorinated olefins with comonomers, small particle sizes of the resulting dispersion, good polymerization yields i.e. a high amount of solids can be produced, and good dispersion stability, among other benefits.

In accordance with one aspect of the present disclosure, there is provided microemulsions derived from a composition comprising: (a) water; (b) at least one ethylenically unsaturated fluoromonomer; and (c) at least one oligomeric fluorosulfinic compound.

In another aspect, the present disclosure provides microemulsions derived from a composition comprising: (a) water; (b) at least one ethylenically unsaturated fluoromonomer; and (c) at least one ethylenically unsaturated, polymerizable monomeric fluorosulfinic compound.

In another aspect, the present disclosure provides a method for making a fluoropolymer comprising aqueous emulsion polymerization of these microemulsions.

In yet another aspect, the present disclosure provides a fluoropolymer derived from these microemulsions.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term:
"a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.).

"Oligomer" means less than 20,000 g/mol, less than 15,000 g/mol, less than 10,000 g/mol, less than 5,000 g/mol, less than 2,000 g/mol, less than 1,000 g/mol, and even less than 500 g/mol.

"Linking group" means a divalent linking group. In one embodiment, the linking group includes at least 1 carbon atom (in some embodiments, at least 2, 4, 8, 10, or even 20 carbon atoms). The linking group can be a linear or branched, cyclic or acyclic structure, that may be saturated or unsaturated, substituted or unsubstituted, and optionally contains one or more hetero-atoms selected from the group consisting of sulfur, oxygen, and nitrogen, and/or optionally contains one or more functional groups selected from the group consisting of ester, amide, sulfonamide, carbonyl, carbonate, urethane, urea, and carbamate. In another embodiment, the linking group does not comprise a carbon atom and is a catenary heteroatom such as oxygen, sulfur, or nitrogen.

"Highly fluorinated" means repeating monomer units that are perfluorinated with partially fluorinated end groups that may optionally contain chlorine on oligomers derived therefrom. For example, when a perfluorinated initiator is used, a perfluorinated sulfinic acid oligomer is produced. In another example, when an organic initiator is used, hydrogen atoms will be present in the "R" end groups of formula I (shown above).

"Sulfinate" is used to indicate both sulfinic acids and sulfinic acid salts. Also herein, "fluorosulfinate" and "fluorinated sulfinate" are used interchangeably to indicate sulfinic acids and sulfinic acid salts which contain at least one fluorine atom.

"Polymerizable" means, when a fluorosulfinic compound is a perfluorinated vinyl ether monomeric fluorosulfinic compound, there is no secondary carbon in the four position, such as, for example, the fluorosulfinate disclosed in Example 5 of U.S. Pat. No. 5,639,837 (Farnham et al.).

Also,

as used herein, refers to a segment X (e.g., a monomer) in a compound, such as in an oligomer. In this instance, "n" refers to the number of times segment X is repeated in the compound and may include either random or block copolymer configurations. For example, in

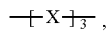

then the compound would include block copolymer and random copolymer configurations, for example, —XXXYYY— as well as XYXYXY— or YXXYXY—.

A process for the (co)polymerization of fluorinated monomers in aqueous emulsion is described in U.S. Pat. No. 4,864,006 to Giannetti et al. (herein incorporated by reference in its entirety), where a microemulsion of perfluoropolyoxyalkylenes according to U.S. Pat. No. 4,990,283 to Visca et al. (herein incorporated by reference in its entirety) is added to the reaction medium. As disclosed in U.S. Pat. No. 5,959,026 to Abusleme et al. (herein incorporated by reference in its entirety), with respect to a conventional (co)polymerization process in emulsion, the use of microemulsions provides various advantages, such as greater productivity, better reproducibility in carrying out the reaction and in the features of the final product, and easier control of the reaction kinetic. Without being bound by theory, it is thought that these advantages are largely due to the differences between a microemulsion and a conventional (or macroemulsion) emulsion. A microemulsion is a system where an aqueous phase is dispersed in an oil phase (in case of water-in-oil systems) or vice versa (in oil-in-water system), the dispersed phase being in the form of very little drops, such as for example, having diameters lower than 200 nm. The microemulsion appears as a limpid and macroscopically homogeneous solution. A macroemulsion is a thermodynamically unstable system, having a lacteous aspect, since the dispersed phase is in the form of little drops of high diameter (of about some microns and more). In order to obtain a macroemulsion it is necessary to supply high mechanical energy, and the resulting system tends to un-mix in two distinct phases due to ageing or centrifugation.

The present disclosure relates to microemulsions derived from compositions containing water, at least one ethylenically unsaturated fluoromonomer, and at least one oligomeric fluorosulfinic compound and/or at least one ethylenically unsaturated, polymerizable monomeric fluorosulfinic compound. The oligomeric fluorosulfinic compound and/or at least one ethylenically unsaturated, polymerizable monomeric fluorosulfinic compound useful in the present disclosure can be partially fluorinated or highly fluorinated. Oligomeric fluorosulfinic compounds useful in the present disclosure include highly fluorinated sulfinate oligomers according to the following formula (IV):

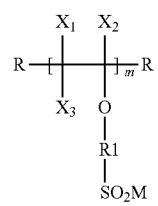

In some embodiments, $X_1$, $X_2$, and $X_3$ are independently selected from F, Cl and $CF_3$. R is independently selected from hydrogen, iodine, bromine, linear or branched alkyl, and linear or branched fluoroalkyl group, optionally containing caternary heteratoms. In some embodiments, the alkyl group has up to 20 carbon atoms. In some embodiments, R1 is a linear or branched perfluorinated linking group. This linking group may be saturated or unsaturated, substituted or unsubstituted, and optionally comprises catenary heteroatoms.

In some embodiments, Y is a halide. Halides useful in the present disclosure include fluorine and chloride. M is a cation. Exemplary cations useful in the present disclosure include $H^+$, $NH_4^+$, $PH_4^+$, $H_3O^+$, $Na^+$, $Li^+$, $Cs^+$, $Ca^{+2}$, $K^+$, $Mg^{+2}$, $Zn^{+2}$, and $Cu^{+2}$, and/or an organic cation including, but not limited to $N(CH_3)_4^+$, $NH_2(CH_3)_2^+$, $N(CH_2CH_3)_4^+$, $NH(CH_2CH_3)_3^+$, $NH(CH_3)_3^+$, $((CH_3CH_2CH_2CH_2)_4)P^+$, and the like, and combinations thereof. For methods useful in the present disclosure, m is selected from any number of 2 or higher.

Highly fluorinated sulfinate oligomers according to formula (IV) in the present disclosure can be prepared according to the steps in the following method:

(a) providing a highly fluorinated vinyl sulfonyl halide;
(b) oligomerizing the highly fluorinated vinyl sulfonyl halide with an initiator to provide a highly fluorinated oligomeric sulfonyl halide according to the following formula (I):

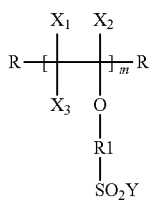

(c) and, reducing the highly fluorinated oligomeric sulfonyl halide to a highly fluorinated sulfinate oligomer according to the following formula (IV),

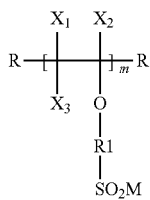

$X_1$, $X_2$, $X_3$, R, R1, Y, M and m are the same as defined above.

In some embodiments, the highly fluorinated vinyl sulfonyl halide is a perfluorovinyl ether sulfonyl halide, such as, for example, a perfluorovinyl ether sulfonyl fluoride. Exemplary perfluorovinyl ether sulfonyl fluorides according to the present disclosure include, but are limited to,

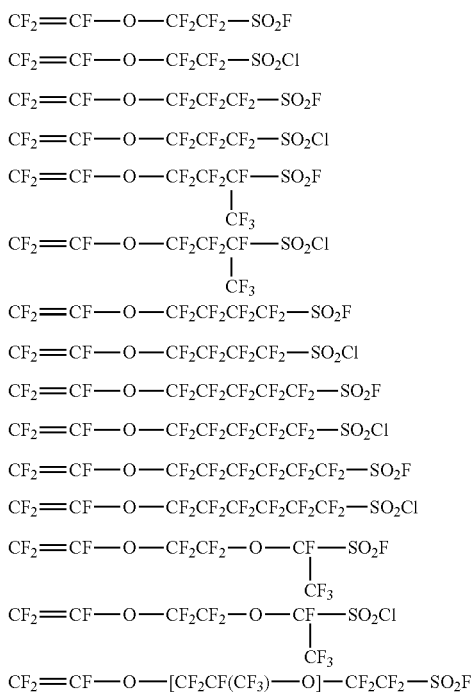

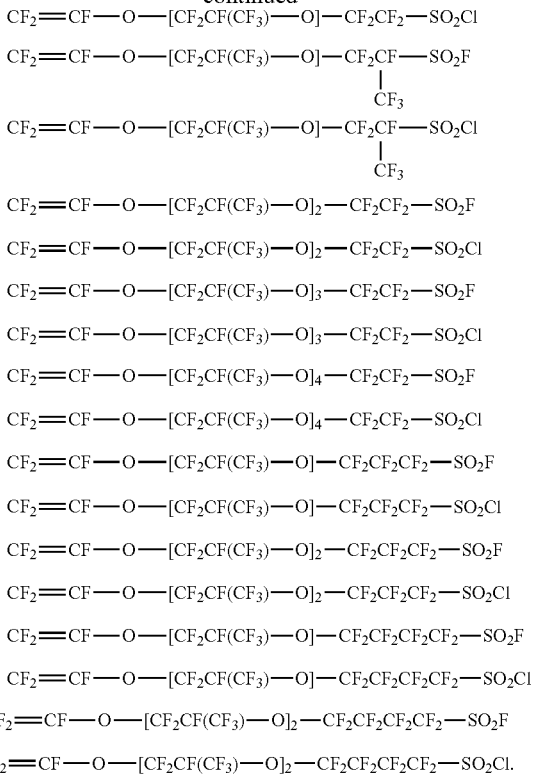

In some embodiments, the method for preparing highly fluorinated oligomeric sulfinic acids also includes step (d) acidifying the highly fluorinated sulfinate oligomer from step (c) and extracting a highly fluorinated sulfinic acid oligomer therefrom. Any acid can be used in step (d). Exemplary acids include sulfuric acid, hydrochloric acid and other strong mineral acids, and the like, and combinations thereof. Extraction can be conducted using any known extraction techniques, such as for example, using vacuum stripping and/or filtration with or without addition of an additional component. Exemplary components include, but are not limited to, an alcohol, an ether, and the like. In some embodiments, methanol is a preferred. In some embodiments methyl-t-butyl ether is preferred.

In some embodiments, the method for preparing the highly fluorinated oligomeric sulfinic acids also includes step (e) converting the highly fluorinated oligomeric sulfinic acids from step (d) to form a salt thereof. In some embodiments, step (e) is conducted using an organic base. In some embodiments, step (e) is conducted using an inorganic base. In some embodiments, ammonium hydroxide is preferred. In some embodiments, potassium hydroxide is preferred.

In some embodiments, the method for preparing highly fluorinated oligomeric sulfinic acids also includes sulfonate that is produced by partial reduction of the highly fluorinated oligomeric sulfonyl halide following hydrolysis of remaining sulfonyl halide to sulfonate.

In some embodiments, the method for preparing highly fluorinated oliogomeric sulfinic acids also includes co-oligomerization of the highly fluorinated oligomeric sulfonyl halide according to formula (I) with a highly fluorinated vinyl ether to provide a structure according to formula (II):

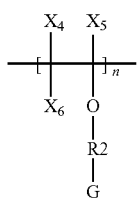

In some embodiments, $X_4$, $X_5$, or $X_6$ are independently selected from H, F, Cl and $CF_3$. In some embodiments, R2 is a linear or branched fluorinated linking group and optionally comprises catenary heteroatoms. The linking group may be saturated or unsaturated and substituted or unsubstituted, and optionally comprises catenary heteroatoms.

G is selected from a perfluoroalkyl, a perfluoroalkoxy, a functional group, and combinations thereof. In some embodiments, the perfluoroalkyl group has up to 30 carbon atoms. In some embodiments, the perfluoroalkoxy group has up to 30 carbon atoms. In some embodiments, when G is a functional group, the functional group is selected from carboxylic acids and derivatives thereof, nitriles, sulfonyl halides, sulfonates, imidates, amidines, alcohols, mercaptans, iodine, bromine, and combinations thereof.

The variable n is at least 1. For methods useful in the present disclosure, $X_4$, $X_5$, $X_6$, G and R2 are selected such that the highly fluorinated vinyl ether according to formula (II) is different than the highly fluorinated oligomeric sulfonyl halide according to formula (I).

In some embodiments, the highly fluorinated vinyl ether according to formula (II) is reduced, such as for example in step (c), to produce an alcohol derivative of the highly fluorinated vinyl ether. For example, when the G in formula (II) is selected to be a carbonyl group, the highly fluorinated vinyl ether according to formula (II) is reduced in step (c) to produce an alcohol derivative thereof.

R1 in formula (I) and R2 in formula (II) are linear or branched fluorinated linking groups. In some embodiments, R1 and R2 are independently selected from $-(CF_2)_a-$, $-O(CF_2)_a-$, $-(CF_2)_a-O-(CF_2)_b-$, $-(CF_2)_a-[O-(CF_2)_b]_c-$, and $-[(CF_2)_a-O-]_b-[(CF_2)_c-O-]_d$, $-(CF_2)_a-[O-(CF(CF_3)CF_2)_b]_c-$, and combinations thereof, where a, b, c, and d are independently at least 1. Exemplary linear and branched linking groups that are useful as R1 and R2 in the present disclosure include, but are not limited to, $-CF_2CF_2-$, $-CF_2CF_2CF_2CF_2-$, $-CF_2CF(CF_3)-O-CF_2CF_2-$.

In some embodiments, the method for preparing highly fluorinated sulfinic acids may also include, in step (b) shown above, co-oligomerization of the highly fluorinated vinyl sulfonyl halide according to formula (I) with an ethylenically-unsaturated monomer to provide a structure according to formula (III):

In some embodiments, Z is derived from monomers selected from ethylene, propylene, tetrafluoroethylene, chlorotrifluoroethylene, hexafluoropropylene, vinylidene fluoride, vinyl fluoride, fluorinated alkyl vinyl ethers, fluorinated alkoxy vinyl ethers, fluorinated vinyl ethers containing a functional group, perfluoro-1,3-dioxoles, and the like, and combinations thereof. The variable p is at least 1.

In some embodiments, the ethylenically-unsaturated monomer according to formula (III) can be co-oligomerized with the highly fluorinated vinyl sulfonyl halide according to formula (I) and the highly fluorinated vinyl ether according to formula (II).

In some embodiments, when Z is an ethylenically-unsaturated monomer containing a functional group, the functional group is selected from bromine and/or iodine. Exemplary ethylenically-unsaturated monomers containing a functional group are derived from one or more compounds of the following formula (V):

$$CX_2=CX(Z)$$

In some embodiments, each X is independently selected from hydrogen or fluorine. In some embodiments, Z is selected from iodine, bromine or $R_f-U$ where U is selected from iodine or bromine, and $R_f$ is a perfluorinated or partially perfluorinated alkylene group optionally containing oxygen atoms. In some embodiments, non-fluorinated bromo- or iodo-olefins, e.g., vinyl iodide and allyl iodide, can be used. Exemplary ethylenically-unsaturated monomer containing a functional group include, but are not limited to:

$CH_2=CHI$ $CF_2=CHI$ $CF_2=CFI$ $CH_2=CHCH_2I$ $CF_2=CFCF_2I$ $CH_2=CHCF_2CF_2I$ $CH_2=CHCF_2CF_2CH_2CH_2I$ $CH_2=CH(CF_2)_4I$ $CH_2=CH(CF_2)_4CH_2CH_2I$ $CH_2=CH(CF_2)_6I$ $CH_2=CH(CF_2)_6CH_2CH_2I$ $CF_2=CFCH_2CH_2I$ $CF_2=CFCF_2CF_2I$ $CF_2=CFOCF_2CF_2I$ $CF_2=CFOCF_2CF_2CH_2CH_2I$ $CF_2=CFOCF_2CF_2CF_2I$ $CF_2=CFOCF_2CF_2CF_2I$ $CF_2=CFOCF_2CF_2CF_2CH_2CH_2I$ $CF_2=CFOCF_2CF_2CH_2I$ $CF_2=CFOCF_2CF_2CF_2CH_2I$ $CF_2=CFCF_2OCH_2CH_2I$ $CF_2=CFO(CF_2)_3-OCF_2CF_2I$ $CH_2=CHBr$ $CF_2=CHBr$ $CF_2=CFBr$

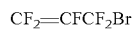

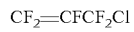

and combinations thereof.

In some embodiments, the oligomerization step (b) is conducted in the absence of a solvent. That is, a solvent is not added to the mixture being oligomerized or co-oligomerized in step (b). In some embodiments, the oligomerization step (b) is conducted in the presence of a solvent. Solvents useful in the present disclosure include perfluorocarbons, perfluoroethers, chlorofluoroethers, chlorocarbons, hydrofluoroethers and water, and the like, and combinations thereof.

The solvent should be present in an amount sufficient to allow adequate stirring and heat transfer during the reaction. In some embodiments, the solvent can be removed after completion of the reaction.

Any conventional method may be used to remove the solvent, such as extraction, distillation under reduced pressure, column chromatography, and any other separation method.

In some embodiments, an initiator is used. Any conventional initiator can be used, such as, for example, persulfates, peroxides (e.g., organic peroxides, such as diacyl peroxides, peroxyesters, dialkyl peroxides, hyrdoperoxides, etc.), photo irradiation, azo compounds, and the like. In some embodiment, the preferred initiator is selected from peroxidic compounds. Hydrogen peroxide, acyl peroxides such as, for example, diacetyl peroxide, dipropionyl peroxide, dibutyryl peroxide, dibenzoyl peroxide, benzoyl acetyl peroxide, dilauroyl peroxide, disuccinic peroxide or diglutaric peroxide may be mentioned here, but only as examples. In addition, water-soluble peracids, such as peracetic acid, and their water-soluble salts (in particular the ammonium, sodium or potassium salts) or their esters, such as, for example, tert.-butyl peroxyacetate and tert.-butyl peroxypivalate, may be mentioned. The water-soluble salts, in particular the ammonium, potassium and sodium salts of other peracids, such as peroxomono- and peroxodisulfates, perphosphates, perborates and percarbonates may also be employed. Perfluoroacyl peroxides or $\Omega$-hydroperfluoroacyl peroxides are furthermore suitable. Azo compounds useful in the present disclosure include azoisobutyronitrile and azo-2-cyanovaleric acid and the like. In some embodiments, certain water-soluble azo compounds are preferred. Conventional active redox systems that generate radicals to an adequate extent at temperatures between 10° C. and 50° C. can also be employed as initiators, above all in the low temperature range. An exemplary redox systems includes the combination of water-soluble peroxidic compounds, preferably peroxodisulfates, with hydrogen sulfite or with disulfite or its addition products with formaldehyde, with thiosulfate and with diimine-liberating compounds, such as, for example, with hydrazine or azodicarboxamide may be mentioned, but only as example. The salts, preferably the alkali metal salts and, in particular, the ammonium salts, of the compounds mentioned are also present in the redox combinations. If the oligomerization takes place in an organic solvent, in each case those of the abovementioned catalysts must be selected such that they are adequately soluble in the solvent concerned.

In this process, the entire amount of initiator can be added at the beginning of the oligomerization reaction in step (b). However, it may be expedient in relatively large batches to rinse in the entire amount of initiator continuously during the course of the oligomerization in step (b). Equally, part of the amount of the initiator can alternatively be added at the beginning and the remainder in one or more batches can be rinsed in later. The addition of coactivators, i.e. for example, soluble salts of iron and of silver, may be advantageous, in particular when redox systems are used as initiators.

Reducing agents useful in the present disclosure include those commonly known as reducing agents, such as, for example, those listed below. Exemplary reducing agents include metal hydrides, such as $MeLH_4$, where Me is an alkaline metal and L is either an aluminum or a boron and $MeH_x$, where Me is either an alkaline metal or an alkaline earth metal, and x is 1 or 2. These types of reducing agents include, for example, lithium aluminum hydride, lithium boron hydride, potassium boron hydride, sodium boron hydride, sodium hydride, lithium hydride, potassium hydride, barium hydride, calcium hydride, and the like. In some embodiments, the preferred reducing agent is sodium borohydride.

In some embodiments, useful reducing agents include reductive inorganic acids. These types of reducing agents include, for example, hydracid iodide, hydracid bromide, hydrophosphoric acid, hydracid sulfide, arsenious acid, phosphorous acid, sulfurous acid, nitrous acid, formic acid, oxalic acid, and the like. In some embodiments, useful reducing agents include mixtures of metals and acids. Metals useful in these types of reducing agents include, for example, tin, iron, zinc, amalgam of zinc, and the like. Acids useful in these types of reducing agents include, for example, hydrochloric acid, sulfuric acid, acetic acid, phosphoric acid, formic acid, trifluoromethane sulfonic acid, trifluoroacetic acid, trichloroacetic acid, and the like.

In some embodiments, useful reducing agents include organic metal compounds, such as, for example, butyl lithium, Grignard reagent (such as alkyl carbon atom of 1 to 8), aryl magnesium halide, triethyl aluminum, trisobutyl aluminum, sodium-benzene, sodium-naphthalene, and the like. In some embodiments, metal compounds with low valences are useful reducing agents, such as, for example, stannous chloride, ferrous sulfate, titanium trichloride, ferrous chloride, stannous sulfate, ferrous sulfide, stannous sulfide, ferrous bromide, stannous bromide, ferrous hydroxide, and the like. In some embodiments, reductive salts of inorganic acids and compounds of the same are useful reducing agents. These types of reducing agents include, for example, iodides, bromides, sulfides, phosphites, sulfites, arsenites, dithionites, nitrites, formates, and the like. Mixtures of metals, water, steam, alcohols or alkalis can also be used as reducing agents in the present disclosure. Also useful as reducing agents are reductive organic compounds, such as, for example, triethanolamine, acetaldehyde, formaldehyde, propyl aldehyde, and the like, and reductive gases, such as, for example, carbon monooxide, sulfur dioxide, hydrogen iodide, hydrogen bromide, hydrogen sulfide, and the like. In some embodiments, a reducing agent useful in the present disclosure is selected from at least one of sodium borohydride, potassium borohydride, lithium aluminum hydride, $NH_2NH_2$, $K_2SO_3$, $Na_2SO_3$, $NaHSO_3$ and $KHSO_3$.

Oligomeric fluorosulfinic compounds useful in the present disclosure include partially fluorinated sulfinate oligomers according to the following formula (VI):

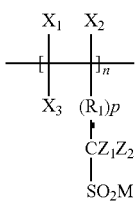

(VI)

wherein $X_1$, $X_2$, and $X_3$ are independently selected from H, F, Cl, Br, I, $CF_3$, and $CH_3$ and wherein at least one of $X_1$, $X_2$, or $X_3$ is H; $R_1$ is a linking group, $Z_1$ and $Z_2$ are independently selected from Br, Cl, I, F, $CF_3$, and a perfluoroalkyl group; M is a cation; p is 0 or 1; and n is at least 2.

In some embodiments, the partially fluorinated sulfinate oligomers further comprise:

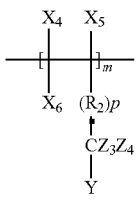

wherein $X_4$, $X_5$, and $X_6$ are independently selected from H, F, Cl, Br, I, $CF_3$, and $CH_3$; $R_2$ is a linking group; $Z_3$ and $Z_4$ are independently selected from Br, Cl, F, $CF_3$, and a perfluoroalkyl vinyl group; Y is selected from —H, —Br, —COOM, —$SO_3M$, and —$[CX_1X_3$—$CX_2(RiCZ_1Z_2Y_1)]q$, where $Y_1$ is selected from —H, —Br, —COOM, —$SO_3M$, —$SO_2M$, and —$[CX_1X_3$—$CX_2(R_1CZ_1Z_2Y_1)]q$; M is a organic cation; p is 0 or 1; and m is at least 1 and q is at least 1.

In some embodiments, a method for making the partially fluorinated sulfinate oligomers is described comprising: oligomerizing halofluoroalkene monomer, $CX_7X_9$=$CX_8$—$(R_3)_p$—$CZ_5Z_6$—Y, with a sulfinating system to produce the composition of formula (I), wherein $X_7$, $X_8$, and $X_9$ are independently selected from H, F, Cl, Br, I, $CF_3$, and $CH_3$, and wherein at least one of $X_7$, $X_8$, and $X_9$ is H; and $R_3$ is a linking group; $Z_5$ and $Z_6$ are independently selected from Br, Cl, I, F, $CF_3$, and a perfluoroalkyl group; p is 0 or 1; and Y is selected from I, Br, and Cl.

Ethylenically unsaturated, polymerizable monomeric fluorosulfinic compound is selected from a highly fluorinated vinylether sulfinate according to formula (VII):

$$CX_1X_3=CX_2—O—R—CFX—SO_2M$$

wherein $X_1$, $X_2$, and $X_3$ are independently selected from F, Cl, and $CF_3$; X is F or a linear or branched perfluorinated alkyl group; and R is a linear or branched perfluorinated linking group, which may be saturated or unsaturated, substituted or unsubstituted, and optionally comprises catenary heteroatoms; and M is a cation.

In some embodiments, R—CFX group in formula (VII) is selected from: —$CF_2CF_2$—, —$CF_2CF_2CF_2CF_2$—, —$CF_2CF_2OCF_2CF_2$—, —$CF_2CF(CF_3)$—O—$CF_2CF_2$—. In some embodiments, $X_1$, $X_2$, and $X_3$ in formula (VII) are fluorine. In some embodiments, exemplary highly fluorinated vinylether sulfinate useful in the present disclosure include:

$$CF_2=CF—O—C_4F_8—SO_2F$$

$$CF_2=CF—O—C_3F_6—O—CF_3$$

$$CF_2=CF—O—CF_2CF(CF_3)—OC_2F_4—SO_2F.$$

In some embodiments, highly fluorinated vinylether sulfinates according to formula (VII) have been synthesized by utilizing methods such as reduction of fluorosulfonyl halide polymer side chains and dehalogenation and sulfination of alkyl halide polymer side chains, as reported in U.S. Pat. No. 4,544,458 (Grot et al.) and Japanese Patent No. 52-24176 (Seko et al.).

Ethylenically unsaturated, polymerizable monomeric fluorosulfinic compounds useful in the present disclosure also include those shown in formula (VIII):

$$CX_1X_3=CX_2—(R_1)_p—CZ1Z2-SO_2M \qquad (VIII)$$

wherein $X_1$, $X_2$, and $X_3$ are independently selected from H, F, Cl, Br, I, $CF_3$, and $CH_3$, and wherein at least one of $X_1$, $X_2$, or $X_3$ is a H; R1 is a linking group; Z1 and Z2 are independently selected from F, Cl, I, Br, $CF_3$, and a perfluoroalkyl group; p is 0 or 1; and M is a cation.

$R_1$ may be non-fluorinated (no hydrogens are replaced by fluorine atoms), partially fluorinated (some of the hydrogens are replaced by fluorine atoms) or perfluorinated (all of the hydrogens are replaced by fluorine atoms). In some embodiments, a hydrogen atom is replaced with a halogen other than fluorine, such as a chlorine, a bromine or an iodine atom, or a combination thereof. $R_1$ may or may not comprise double bonds. $R_1$ may be substituted or unsubstituted, linear or branched, cyclic or acyclic, and may optionally comprise a functional group (e.g., esters, ethers, ketones, amines, halides, etc.).

In one embodiment, $R_1$ is selected from: —$(CH_2)_a$—, —$(CF_2)_a$—, —$(CF_2)_a$—O—$(CF_2)_b$—, —$(CF_2)_a$—[O—$(CF_2)_b]_c$—, and —$[(CF_2)_a$—O—$]_b$—$[(CF_2)_c$—O—$]_d$, and combinations thereof, wherein a, b, c, and d are independently at least 1, 2, 3, 4, 10, 20, etc.

In one embodiment, $R_1$ is a perfluorinated group, optionally comprising heteroatoms, and $X_1$, $X_2$, and $X_3$ are all H.

In another embodiment, $R_1$ is a catenary heteroatom such as oxygen, sulfur, or nitrogen.

M in formula (VIII) may comprise $H^+$, an inorganic cation including, but not limited to: $Na^+$, $Li^+$, $Cs^+$, $Ca^{+2}$, $K^+$, $NH_4^+$, $Mg^{+2}$, $Zn^{+2}$, and $Cu^{+2}$, and/or an organic cation including, but not limited to $N(CH_3)_4^+$, $NH_2(CH_3)_2^+$, $N(CH_2CH_3)_4^+$, $NH(CH_2CH_3)_3^+$, $NH(CH_3)_3^+$, and $((CH_3CH_2CH_2CH_2)_4)P^+$.

Exemplary monomers according to formula (VIII) include: $CH_2=CH—(CF_2)_4—SO_2H$, $CH_2=CF—(CF_2)_4—SO_2H$, $CH_2=CH—(CF_2)_2—SO_2H$, $CH_2=CH—(CF_2)_6—SO_2H$, $CH_2=CH—CF_2—SO_2H$, $CH_2=CH—(CF_2)_4—SO_2NH_4$, $CH_2=CH—(CF_2)_2—SO_2NH_4$, $CH_2=CH—(CF_2)_6—SO_2NH_4$, $CH_2=CH—CF_2—SO_2NH_4$, $CH_2=CH—(CF_2)_4—SO_2Na$, $CH_2=CH—(CF_2)_2—SO_2Na$, $CH_2=CH—(CF_2)_6—SO_2Na$, $CH_2=CH—CF_2—SO_2Na$, $CH_2=CH—(CF_2)_4—SO_2K$, $CH_2=CH—(CF_2)_2—SO_2K$, $CH_2=CH—(CF_2)_6—SO_2K$, $CH_2=CH—CF_2—SO_2K$, $CH_2=CH—(CF_2)_4—SO_2Li$, $CH_2=CH—(CF_2)_2—SO2Li$, $CH_2=CH—(CF_2)_6—SO_2Li$, $CH_2=CH—CF_2—SO_2Li$, $CH_2=CH—(CF_2)_4—O(CF_2)_2—SO_2H$, $CH_2=CH—(CF_2)_2O(CF_2)_2—SO_2H$, $CH_2=CH—(CF_2)_4—O(CF_2)_2SO_2NH_4$, $CH_2=CH—(CF_2)_2—O(CF_2)_2SO_2NH_4$, $CH_2=CH—(CF_2)_4—O(CF_2)_2SO_2Na$, $CH_2=CH—(CF_2)_2—O(CF_2)_2SO_2Na$, $CH_2=CH—(CF_2)_4—O(CF_2)_2SO_2K$, $CH_2=CH—(CF_2)_2—O(CF_2)_2SO2K$, $CH_2=CH—(CF_2)_4—O(CF_2)_2SO_2Li$, and $CH_2=CH—(CF_2)_2—O(CF_2)_2SO_2Li$.

In one embodiment, the monomer according to formula (VIII) includes:

$$CH_2=CH-(CF_2)_n-SO_2M \qquad (VIIIa)$$

where M is a cation and n is at least 1, 2, 4, 6, 10, 20, etc. In another embodiment, the monomer according to formula (VIII) includes:

$$CH_2=CH-(CF_2)_2O(CF_2)_2-SO_2M \qquad (VIIIb)$$

(where M is defined as above).

In the present disclosure, the monomer according to formula (VIII) may be prepared by Method I or Method II as disclosed below.

A precursor to the monomer of formula (VIII) is shown in formula (IX):

$$CX_4X_1X_3-CX_5X_2-(R_1)_p-CZ1Z2-SO_2M \qquad (IX)$$

wherein $X_1$, $X_2$, and $X_3$ are independently selected from H, F, Cl, Br, I, $CF_3$ or $CH_3$, wherein at least one of $X_1$, $X_2$, or $X_3$ is a H, and $X_4$ and $X_5$ are independently selected from H, F, Cl, Br and I; $R_1$ is a linking group; Z1 and Z2 are independently selected from F, Cl, I, Br, $CF_3$, and a perfluoroalkyl group, p is 0 or 1; and M is selected from F and a cation.

$R_1$ may be non-fluorinated, partially fluorinated, or perfluorinated. In some embodiments, the hydrogen atoms are replaced with a halogen other than fluorine, such as a chlorine, a bromine or a iodine atom, or a combination thereof. $R_1$ may or may not comprise double bonds. $R_1$ may be substituted or unsubstituted, linear or branched, cyclic or acyclic, and may optionally comprise a functional group (e.g., esters, ethers, ketones, amines, halides, etc.).

In some embodiments, $R_1$ is a perfluorinated group, optionally comprising a heteroatom, and $X_1$, $X_2$, and $X_3$ are all H. In some embodiments, $R_1$ is a catenary heteroatom such as oxygen, sulfur, or nitrogen.

M in formula (VIII) may comprise F, $H^+$ an inorganic cation including, but not limited to: $Na^+$, $Li^+$, $Cs^+$, $Ca^{+2}$, $K^+$, $NH_4^+$, $Mg^{+2}$, $Zn^{+2}$, and $Cu^{+2}$ and/or an organic cation including, but not limited to $N(CH_3)_4^+$, $NH_2(CH_3)_2^+$, $N(CH_2CH_3)_4^+$, $NH(CH_2CH_3)_3^+$, $NH(CH_3)_3^+$, and $((CH_3CH_2CH_2CH_2)_4)P^+$.

In some embodiments, the monomer according to formula (VIII) includes:

$$XCH_2CH_2-(CF_2)_n-SO_2M \qquad (VIIIc)$$

where M is defined as above; X is selected from H, F, Cl, Br, I, $CF_3$ or $CH_3$; and n is at least 1, 2, 4, 6, 10, 20, etc. In some embodiments, the monomer according to formula VIII includes:

$$XCH_2-CH_2-(CF_2)_2O(CF_2)_2-SO_2M \qquad (VIIId)$$

where M is F or a cation and X is selected from F, Cl, Br, and I.

The precursor shown in formula (IX) is obtained during the process as disclosed in Method II below.

In Method I, a terminal alkene compound and a halofluorosulfonylfluoride are reacted together to produce a halohydrofluorosulfonylfluoride. The halohydrofluorosulfonylfluoride is then dehalohydrogenated to produce an alkenefluorosulfonylfluoride. Then the alkenefluorosulfonylfluoride is reduced to produce an alkenefluorosulfinic acid or salt. An exemplary reaction scheme is shown below:

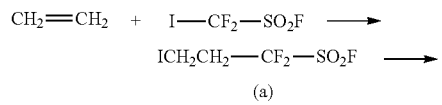

(a)

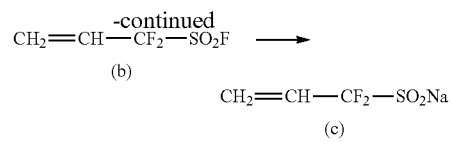

(b)

$$CH_2=CH-CF_2-SO_2Na$$

(c)

The terminal alkene compound of the present disclosure comprises a terminal carbon-carbon double bond with at least one hydrogen off of the carbon double bond. Exemplary terminal alkene compounds include: ethylene, propylene, butylene, bromoethylene, chloroethylene, fluoroethylene, vinylidene fluoride, $CH_2=CHCl$, $CF_3OCH=CH_2$, $C_3F_7OCH=CH_2$, and $CH_3OCH=CH_2$.

The halofluorosulfonylfluoride of the present disclosure is a Ω-halofluorosulfonylfluoride (i.e., a terminal sulfonyl fluoride). The halofluorosulfonylfluoride comprises a compound of the general formula: $X_5(R_1)_p-CZ1Z2-SO_2F$ where $X_5$ is selected from Br, I, and Cl; $R_1$ is a linking group as described above; Z1 and Z2 are independently selected from F, Cl, Br, $CF_3$ and a perfluoroalkyl group; and p is 0 or 1.

Exemplary halofluorosulfonylfluorides include: $ICF_2CF_2-O-CF_2CF_2SO_2F$, $ICF_2CF_2CF_2CF_2-O-CF_2CF_2SO_2F$, $I(CF_2)_4SO_2F$, $I(CF_2)_3SO_2F$, $I(CF_2)_5SO_2F$, $I(CF_2)_6SO_2F$, $BrCF_2SO_2F$, $BrCF_2CF_2-O-CF_2CF_2SO_2F$, $BrCF_2CF_2CF_2CF_2-O-CF_2CF_2SO_2F$, $Br(CF_2)_4SO_2F$, $Br(CF_2)_3SO_2F$, $Br(CF_2)_5SO_2F$, $Br(CF_2)_6SO_2F$, $ICF_2SO_2F$, and $BrCF_2SO_2F$.

In some embodiments, the reaction between the terminal alkene compound and the halofluorosulfonylfluoride is initiated thermally, by photo-irradiation, or in the presence of an initiator, or a combination thereof.

In some embodiments, the reaction between the terminal alkene compound and the halofluorosulfonylfluoride may be conducted at a temperature of between at least 10° C., 20° C., 25° C., 30° C., or even 35° C.; at most 90° C., 100° C., 150° C., 200° C. or even 220° C.

In some embodiments, the reaction between the terminal alkene compound and the halofluorosulfonylfluoride may be conducted using photo-irradiation e.g., ultra-violet radiation.

If an initiator is used, exemplary initiators include: a peroxide, a diazo compound, and single electron donor, such as a metal or metal complex, and redox system for radical reaction of fluorinated iodide.

In some embodiments, the reaction between the terminal alkene compound and the halofluorosulfonylfluoride is conducted in the absence of solvent. Eliminating the solvent may reduce processing costs associated with buying and disposing of the solvent.

In some embodiments, the reaction between the terminal alkene compound and the halofluorosulfonylfluoride is conducted in the presence of a first solvent. Exemplary first solvents include: a perfluorinated solvent, such as perfluoromorpholine, and a partially fluorinated solvent, such as $C_4F_9OCH_3$ and $C_4F_9OCH_2CH_3$.

The ratio of terminal alkene compound to the halofluorosulfonylfluoride to produce the halohydrofluorosulfonylfluoride is at least 1 to 1, or even 2:1. Preferably there is an excess of terminal alkene compound in the addition reaction.

The halohydrofluorosulfonylfluoride produced (e.g., (a) above) is then dehalohydrogenated (loss of a halohydrogen, e.g., HI) to produce an alkenefluorosulfonylfluoride. The alkenefluorosulfonylfluoride comprises a fluorinated carbon group linking a terminal double bond and a terminal sulfonyl fluoride group such as shown in (b).

The dehalohydrogenating may be conducted in the presence of a base. Exemplary bases include: 1,8-diazobicyclo[5, 4,0]undec-7-ene (DBU), triethylamine, and tributyl amine. The base should be selected such that the sulfonyl fluoride of the starting material is not hydrolyzed. In some embodiments, the dehalohydrogenating reaction may be conducted at a temperature of between at least 10° C., 20° C., 25° C., 30° C., or even 35° C.; at most 60° C., 70° C., 80° C., or even 90° C. The ratio of base to halohydrofluorosulfonylfluoride is at least 1 to 1, or even 2:1. Preferably there is an excess of base.

In some embodiments, dehalohydrogenating reaction is conducted in the presence of a solvent. Exemplary solvents include, ethers, alcohols, etc.

After dehalohydrogenating the halohydrofluorosulfonylfluoride to form an alkenefluorosulfonylfluoride, the alkenefluorosulfonylfluoride is reduced to produce the monomer according to formula (VIII), an alkenefluorosulfinic acid or salt (e.g., (c) above).

The reducing step may be done in the presence of a reducing agent and a second solvent. The selection of the second solvent may depend on the reducing agent used. Exemplary second solvents include, ethers (such as dialkyl ethers (e.g., diethyl ether), $CH_3OCH_2CH_2OCH_3$, t-butyl methyl ether, glycol dialkyl ether, dioxane, and tetrahydrofuran), alcohols, acetonitrile, water, and combinations thereof.

Hydride reducing agents useful in the present disclosure include those represented by the formula, $M'LH_4$, wherein $M'$ is an alkali metal or an alkaline Earth metal and L is Aluminum or Boron, including, for example, sodium borohydride, sodium cyanoborohydride, potassium borohydride, lithium borohydride, and lithium aluminum hydride. Useful hydride reducing agents also include those represented by the formula, $M''H_n$, wherein $M''$ is an alkali metal, and n is an integer selected from 1 or 2, including, for example, sodium hydride, lithium hydride, potassium hydride, barium hydride, and calcium hydride. Other useful hydride reducing agents include mono-, di-, or tri(lower alkoxy) alkali metal aluminum hydrides, mono-, di-, or tri-(lower alkoxy lower alkoxy) alkali metal aluminum hydrides, di(lower alkyl) aluminum hydrides, alkalimetalcyanoborohydrides, tri(loweralkyl) tin hydrides, tri(aryl) tin hydrides, $Li(C_2H_5)_3BH$, and $(((CH_3)_2CHCH_2)_2AlH)_2$. Another useful reducing agent is a sulfite such as $—CF_2SO_2F$ or $—CF_2SO_2M$, including $K_2SO_3$, $Na_2SO_3$, $KHSO_3$ and $NaHSO_3$.

In Method II, a terminal alkene compound is reacted with a dihalofluorocarbon to produce a haloalkanefluorocarbon halide. The haloalkanefluorocarbon halide is then sulfinated to produce a haloalkenefluorosulfinic acid or salt. Then the haloalkenefluorosulfinic acid or salt is dehalohydrogenated to produce an alkenefluorosulfinic acid or salt. An exemplary reaction scheme is shown below:

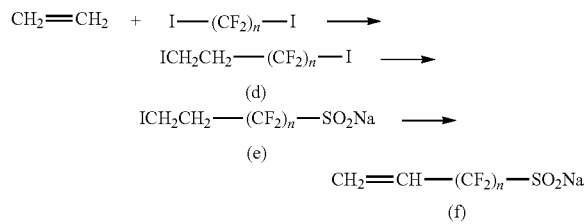

The terminal alkene compound of the present disclosure comprises a terminal carbon-carbon double bond with at least one hydrogen off of the carbon double bond. Exemplary terminal alkene compounds include, ethylene, propylene, butylene, $CH_2=CHCl$, $CH_2=CCl_2$, $CH_2=CHF$ and $CH_2=CF_2$. The dihalofluorocarbon of the present disclosure comprises the general formula: $X_6—(R_1)_p—CZ1Z2-X_7$ wherein $X_6$ and $X_7$ are independently selected from Cl, Br, and I; $R_1$ is a linking group as described above; Z1 and Z2 are independently selected from F, Cl, Br, $CF_3$ and a perfluoroalkyl group; p is 0 or 1.

Reacting the terminal alkene compound and the dihalofluorocarbon together produce a haloalkenefluorocarbon halide (e.g., (d) above). The reaction may be conducted at a temperature of between at least 10° C., 20° C., 25° C., 30° C., or even 35° C.; at most 90° C., 100° C., 150° C., 200° C. or even 220° C.

In some embodiments, the reaction between the terminal alkene compound and the dihalofluorocarbon is initiated in the presence of an initiator. Initiators as known in the art may be used including peroxides, diazo compounds, metals, and combinations thereof. Exemplary peroxide initiators include: diisobutyryl peroxide (available under the trade designation "TRIGONOX 187-C30" from AkzoNobel, Amsterdam), cumyl peroxyneodecanoate (available under the trade designation "TRIGONOX 99-C75" from AkzoNobel), peroxydicarbonate (available under the trade designation "TRIGONOX ADC" from AkzoNobel), t-butyl peroxyneodecanoate (available under the trade designation "TRIGONOX 23" from AkzoNobel), dibenzoyl peroxide, di-t-butyl peroxide, and t-butyl cumyl peroxide. Exemplary diazo compound initiators include: 2,2'-Azobis(2-methylbutyronitrile) (available under the trade designation "VAZO 67" from E.I. du Pont de Nemours & Co, Wilmington, Del.) and 2,2'-azobis (isobutyronitrile). Exemplary metal initiators include: Zn, Mg, Ni and Cu or metal complexes such as $Pd(PPh_3)_4$, $Pt(PPh_3)_4$, $Pb(OAc)_4$ and $RhCl(PPh_3)_3$.

The haloalkenefluorocarbon halide produced is then sulfinated to produce the precursor according to formula (IX), a haloalkenefluorosulfinic acid or salt (see (e) above). In the present disclosure, a sulfinating system is used to dehalosulfinate (i.e., remove a halogen and sulfinate the compound) the haloalkenefluorocarbon halide. Sulfinating systems are known to those skilled in the art. Exemplary sulfinating system include, $Na_2S_2O_4$, $NaHSO_3/(NH_4)_2Ce(NO_3)_6$, $NaHSO_3/FeCl_3$, $NaHSO_3/K_3[Fe(CN)_6]$, $HOCH_2SO_2Na$, and $(NH_2)_2CSO_2$, $Na_2S_2O_5$, and combinations thereof.

The haloalkenefluorosulfinic acid or salt then is dehalohydrogenated to produce the monomer according to formula (VIII), an alkenefluorosulfinic acid or salt (e.g., (f) above). The dehalohydrogenating may be conducted in the presence of a base. Exemplary bases include: KOH, NaOH, LiOH, $Na_2CO_3$, $NaHCO_3$, $K_2CO_3$, 1,8-diazobicyclo[5,4,0]undec-7-ene (DBU), and combinations thereof.

In one embodiment, the dehalohydrogenating reaction may be conducted at a temperature of between at least 10° C., 20° C., 25° C., 30° C., or even 35° C.; at most 60° C., 70° C., 80° C., or even 90° C.

The ratio of base to the haloalkenefluorosulfinic acid or salt thereof is at least 1 to 1, or even 2:1. Preferably there is an excess of base.

In one embodiment, dehalohydrogenating reaction is conducted in the presence of a solvent. Exemplary solvents include, water, alcohol, and combinations thereof.

The monomer according to formula (VIII) and/or the precursor according formula (IX) may be isolated and purified by known methods. In some embodiments, the crude product is isolated from the reaction mixture by filtration to remove insoluble inorganic salts, then rotary evaporation to remove solvent to give sulfinate salt solid. In some embodiments, the crude solid is purified by extracting with warm alcohol, such as isopropanol to remove insoluble inorganic impurity followed by the stripping out of solvent. In some embodiments, the addition of a concentrated acid, such as, for example, sulfuric acid, is added to protonate the sulfinate salt resulting in a phase split. In some embodiments, the crude product is isolated by the addition of an acid, such as, for example, sulfuric acid, followed by extraction with an organic solvent, such as t-butyl methyl ether and diethyl ether. The desired product in acid form then is isolated by removal of the organic solvent.

In some embodiments further purification of the crude product is sometimes not necessary. The elimination of the purification step may reduce processing time and cost. If desired, the reaction mixture or crude product may be purified, for example, by repeated recrystallization.

Advantageously, the monomer according to formula (VIII) may be useful as an initiator for polymers having fewer undesired end-polar groups, or as a polymerizable surfactant, thus eliminating the need to remove the surfactant post-polymerization.

The presently disclosed ethylenically unsaturated, polymerizable monomeric fluorosulfinic compounds may be used in polymerizations of fluoropolymers. For example, because one end of the ethylenically unsaturated, polymerizable monomeric fluorosulfinic compounds according to formula (VI) comprises a double bond, the ethylenically unsaturated, polymerizable monomeric fluorosulfinic compounds may be used in polymerization reactions. Because the other end of the ethylenically unsaturated, polymerizable monomeric fluorosulfinic compounds according to formula (VIII) comprises a sulfinic acid or salt thereof, this site is able to form a radical and act as an initiator in polymerization reactions. Therefore, the ethylenically unsaturated, polymerizable monomeric fluorosulfinic compounds according to formula (VIII) may be consumed during a polymerization. Furthermore, because of the sulfinic acid end group, polymers made using this initiator may have reduced or no amounts of polar end-groups, which may aid in stability of the polymer.

Oligomeric fluorosulfinic compounds according to formulas (IV) and (VI) and ethylenically unsaturated, polymerizable monomeric fluorosulfinic compounds according to formulas (VII) and (VIII) may be used in a variety of applications where a surfactant is needed or desired. The oligomeric fluorosulfinic compounds according to formulas (IV) and (VI) and ethylenically unsaturated, polymerizable monomeric fluorosulfinic compounds according to formulas (VII) and (VIII) have been found to be suitable for use in an aqueous emulsion polymerization of fluorinated and/or non-fluorinated monomers. In particular, the presently disclosed oligomeric fluorosulfinic compounds and/or ethylenically unsaturated, polymerizable monomeric fluorosulfinic compounds can be used in the aqueous emulsion polymerization of at least one ethylenically unsaturated fluoromonomer, e.g. fluorinated olefin, to make fluoropolymers that have a partially or fully fluorinated backbone.

In a particular preferred embodiment, one or more oligomeric fluorosulfinic compounds of formulas (IV) and (VI) and/or ethylenically unsaturated, polymerizable monomeric fluorosulfinic compounds according to formulas (VII) and (VIII) are used in the aqueous emulsion polymerization of one or more ethylenically unsaturated fluoromonomers, in particular gaseous fluorinated monomers. By gaseous fluorinated monomers is meant monomers that are present as a gas under the polymerization conditions. In a particular embodiment, the polymerization of the ethylenically unsaturated fluoromonomer(s) is started in the presence of at least one oligomeric fluorosulfinic compound according to formulas (IV) and/or (VI) and/or ethylenically unsaturated, polymerizable monomeric fluorosulfinic compounds according to formulas (VII) and (VIII). The amount of oligomeric fluorosulfinic compound and/or ethylenically unsaturated, polymerizable monomeric fluorosulfinic compounds used may vary depending on desired properties such as amount of solids, particle size, etc.

Generally the amount of oligomeric fluorosulfinic compound and/or ethylenically unsaturated, polymerizable monomeric fluorosulfinic compounds will be between 0.001% by weight based on the weight of water in the polymerization and 5% by weight, for example between 0.005% by weight and 2% by weight. A practical range is between 0.05% by weight and 1% by weight. While the polymerization is generally initiated in the presence of the oligomeric fluorosulfinic compound and/or ethylenically unsaturated, polymerizable monomeric fluorosulfinic compounds, it is not excluded to add further fluorinated surfactant during the polymerization, although such will generally not be necessary. Nevertheless, it may be desirable to add certain monomer to the polymerization in the form of an aqueous emulsion. For example, fluorinated monomers and in particular perfluorinated co-monomers that are liquid under the polymerization conditions may be advantageously added in the form of an aqueous emulsion.

The aqueous emulsion polymerization may be carried out at a temperature between 10 to 150° C., preferably 20° C. to 110° C. and the pressure is typically between 2 and 30 bar, in particular 5 to 20 bar. The reaction temperature may be varied during the polymerization to influence the molecular weight distribution, i.e., to obtain a broad molecular weight distribution or to obtain a bimodal or multimodal molecular weight distribution.

The pH of the polymerization media may be in the range of pH 2 to 11, preferably 3 to 10, most preferably 4 to 10.

In addition to use of the oligomeric fluorosulfinic compound and/or ethylenically unsaturated, polymerizable monomeric fluorosulfinic compounds, the aqueous emulsion polymerization is typically initiated by an initiator including any of the initiators known for initiating a free radical polymerization of fluorinated monomers. In some embodiments, oligomeric fluorosulfinic compounds according to formulas (IV) and (VI) and ethylenically unsaturated, polymerizable monomeric fluorosulfinic compounds according to formulas (VII) and (VIII) combined with a specified oxidizing agent can be used as an initiator system for initiation of the aqueous emulsion polymerization of the at least one ethylenically unsaturated fluoromonomer. Oxidizing agents useful in the present disclosure are water soluble oxidizing agents. In some embodiments, oxidizing agents useful in the present disclosure include sodium, potassium, and ammonium persulfates, perphosphates, perborates, and percarbonates. Particularly preferred oxidizing agents are sodium, potassium, and ammonium persulfates. In some embodiments, oxidizing agents useful in the present disclosure include those selected from at least one of chlorate ions, bromate ions, hypochlorite ions, and the like, and combinations thereof.

In some embodiments, suitable initiators include peroxides and azo compounds and redox based initiators. Specific examples of peroxide initiators include, hydrogen peroxide, sodium or barium peroxide, diacylperoxides such as diacetylperoxide, disuccinyl peroxide, dipropionylperoxide, dibutyrylperoxide, dibenzoylperoxide, benzoylacetylperoxide, diglutaric acid peroxide and dilaurylperoxide, and further per-acids and salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. Examples of inorganic include for example ammonium-alkali- or earth alkali salts of persulfates, permanganic or manganic acid or manganic acids. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (such as that available under the trade designation "Rongalit") or fluoroalkyl sulfinates as disclosed in U.S. Pat. No. 5,285,002. The reducing agent typically reduces the half-life time of the persulfate initiator. Additionally, a metal salt catalyst such as for example copper, iron or silver salts may be added. The amount of initiator may be between 0.01% by weight (based on the fluoropolymer solids to be produced) and 1% by weight. In one embodiment, the amount of initiator is between 0.05 and 0.5% by weight. In another embodiment, the amount may be between 0.05 and 0.3% by weight.

The microemulsion may further comprise other materials, such as buffers and, if desired, complex-formers or chain-transfer agents. Examples of chain transfer agents that can be used include dimethyl ether, methyl t-butyl ether, alkanes having 1 to 5 carbon atoms such as ethane, propane and n-pentane, halogenated hydrocarbons such as $CCl_4$, $CHCl_3$ and $CH_2Cl_2$ and hydrofluorocarbon compounds such as $CH_2F$—$CF_3$ (R134a). Additionally esters like ethylacetate, malonic esters are applicable.

Examples of ethylenically unsaturated fluoromonomers that may be polymerized using the presently disclosed microemulsion include partially or fully fluorinated gaseous monomers including fluorinated olefins such as tetrafluoroethylene (TFE), chlorotrifluoroethylene (CTFE), hexafluoropropylene (HFP), vinyl fluoride (VF), vinylidene fluoride (VDF), partially or fully fluorinated allyl ethers and partially or fully fluorinated vinyl ethers. The polymerization may further involve non-fluorinated monomers such as ethylene and propylene.

Further examples of ethylenically unsaturated fluoromonomers that may be used in the microemulsion according to the present disclosure include those corresponding to the formula:

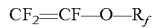

wherein $R_f$ represents a perfluorinated aliphatic group that may contain one or more oxygen atoms. Preferably, the perfluorovinyl ethers correspond to the general formula:

wherein $R_f$ and $R'_f$ are different linear or branched perfluoroalkylene groups of 2-6 carbon atoms, m and n are independently 0-10, and $R''_f$ is a perfluoroalkyl group of 1-6 carbon atoms. Examples of perfluorovinyl ethers according to the above formulas include perfluoro-2-propoxypropylvinyl ether (PPVE-2), perfluoro-3-methoxy-n-propylvinyl ether, perfluoro-2-methoxy-ethylvinyl ether, perfluoromethylvinyl ether (PMVE), perfluoro-n-propylvinyl ether (PPVE-1) and $CF_3$—$(CF_2)_2$—O—$CF(CF_3)$—$CF_2$—O—$CF(CF_3)$—$CF_2$—O—$CF$=$CF_2$.

Examples of fluorinated allyl ethers that can be used include those corresponding to the general formula:

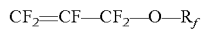

wherein $R_f$ represents a perfluorinated aliphatic group that may contain one or more oxygen atoms.

Still further, the microemulsion may involve comonomers that have a functional group such as for example a group capable of participating in a peroxide cure reaction. Such functional groups include halogens such as Br or I as well as nitrile groups. Specific examples of such comonomers that may be listed here include (a) bromo- or iodo-(per)fluoroalkyl-(per)fluorovinylethers having the formula:

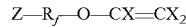

wherein each X may be the same or different and represents H or F, Z is Br or I, $R_f$ is a (per)fluoroalkylene $C_1$-$C_{12}$, optionally containing chlorine and/or ether oxygen atoms; for example: $BrCF_2$—O—$CF$=$CF_2$, $BrCF_2CF_2$—O—$CF$=$CF_2$, $BrCF_2CF_2CF_2$—O—$CF$=$CF_2$, $CF_3CFBrCF_2$—O—$CF$=$CF_2$, and the like; and (b) bromo- or iodo containing fluoroolefins such as those having the formula:

wherein each X independently represents H or F, Z' is Br or I, $R'_f$ is a perfluoroalkylene $C_1$-$C_{12}$, optionally containing chlorine atoms and r is 0 or 1; for instance: bromotrifluoroethylene, 4-bromo-perfluorobutene-1, and the like; or bromofluoroolefins such as 1-bromo-2,2-difluoroethylene and 4-bromo-3,3,4,4-tetrafluorobutene-1.

Examples of nitrile containing monomers that may be used include those that correspond to one of the following formulas:

$$CF_2=CF-CF_2-O-R_f-CN$$

$$CF_2=CFO(CF_2)_LCN$$

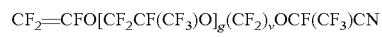

wherein L represents an integer of 2 to 12; g represents an integer of 0 to 4; k represents 1 or 2; v represents an integer of 0 to 6; u represents an integer of 1 to 6, $R_f$ is a perfluoroalkylene or a bivalent perfluoroether group. Specific examples of nitrile containing liquid fluorinated monomers include perfluoro(8-cyano-5-methyl-3,6-dioxa-1-octene), $CF_2$=$CFO(CF_2)_5CN$, and $CF_2$=$CFO(CF_2)_3OCF(CF_3)CN$.

The microemulsion may be used to produce a variety of fluoropolymers including perfluoropolymers, which have a fully fluorinated backbone, as well as partially fluorinated fluoropolymers. Also the microemulsion may result in melt-processible fluoropolymers as well as those that are not melt-processible such as for example polytetrafluoroethylene and so-called modified polytetrafluoroethylene. Polymerization process using the presently disclosed microemulsion can further yield fluoropolymers that can be cured to make fluoroelastomers as well as fluorothermoplasts. Fluorothermoplasts are generally fluoropolymers that have a distinct and well noticeable melting point, typically in the range of 60° C. to 320° C. or between 100° C. and 320° C. They thus have a substantial crystalline phase. Fluoropolymers that are used for making fluoroelastomers typically are amorphous and/or have a negligible amount of crystallinity such that no or hardly any melting point is discernable for these fluoropolymers.

Aqueous emulsion polymerization of the presently disclosed microemulsion results in a dispersion of the fluoropolymer in water. Generally the amount of solids of the fluoropolymer in the dispersion directly resulting from the polymerization will vary between 3% by weight and about 40% by weight depending on the polymerization conditions.

A typical range is between 5 and 30% by weight, for example between 10 and 25% by weight. The particle size (volume average diameter) of the fluoropolymer is typically between 40 nm and 200 nm. The total amount of oligomeric fluorosulfinic compounds and/or ethylenically unsaturated, polymerizable monomeric fluorosulfinic compounds in the resulting dispersion is typically between 0.001 and 5% by weight based on the amount of fluoropolymer solids in the dispersion. A typical amount may be from 0.01 to 2% by weight or from 0.02 to 1% by weight.

The fluoropolymer may be isolated from the dispersion by coagulation if a polymer in solid form is desired. Also, depending on the requirements of the application in which the fluoropolymer is to be used, the fluoropolymer may be post-fluorinated so as to convert any thermally unstable end groups into stable $CF_3$ end groups. The fluoropolymer may be post-fluorinated as described in, for example, EP 222945. Generally, the fluoropolymer will be post fluorinated such that the amount of end groups in the fluoropolymer other than $CF_3$ is less than 80 per million carbon atoms.

For coating applications, an aqueous dispersion of the fluoropolymer is desired and hence the fluoropolymer will not need to be separated or coagulated from the dispersion. To obtain a fluoropolymer dispersion suitable for use in coating applications such as for example in the impregnation of fabrics or in the coating of metal substrates to make for example cookware, it will generally be desired to add further stabilizing surfactants and/or to further increase the fluoropolymer solids. For example, non-ionic stabilizing surfactants may be added to the fluoropolymer dispersion. Typically these will be added thereto in an amount of 1 to 12% by weight based on fluoropolymer solids.

Examples of non-ionic surfactants that may be added include

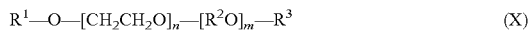

$$R^1—O—[CH_2CH_2O]_n—[R^2O]_m—R^3 \quad (X)$$

wherein $R^1$ represents an aromatic or aliphatic hydrocarbon group having at least 8 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m being at least 2. It will be understood that in the above formula (X), the units indexed by n and m may appear as blocks or they may be present in an alternating or random configuration. Examples of non-ionic surfactants according to formula (X) above include alkylphenol oxy ethylates such as ethoxylated p-isooctylphenol commercially available under the trade designation "TRITON", such as for example "TRITON X 100" wherein the number of ethoxy units is about 10 or "TRITON X 114" wherein the number of ethoxy units is about 7 to 8. Still further examples include those in which $R^1$ in the above formula (X) represents an alkyl group of 4 to 20 carbon atoms, m is 0 and $R^3$ is hydrogen. An example thereof includes isotridecanol ethoxylated with about 8 ethoxy groups and which is commercially available under the trade designation "GENAPOL X080" from Clariant GmbH. Non-ionic surfactants according to formula (X) in which the hydrophilic part comprises a block-copolymer of ethoxy groups and propoxy groups may be used as well. Such non-ionic surfactants are commercially available from Clariant GmbH under the trade designation "GENAPOL PF 40" and "GENAPOL PF 80".

Still further examples of non-ionic surfactants that may be added include an alcohol ethoxylate or mixture of alcohol ethoxylates of the formula (XI):

$$R(OCH_2CH_2)_nOH$$

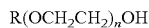

wherein R is a branched alkyl, branched alkenyl, cycloalkyl, or cycloalkenyl hydrocarbon group having 8-18 carbon atoms and n is an average value of 5 to 18. For example, the ethoxylate of this invention can be considered to be prepared from (1) a primary alcohol that is comprised of a hydrocarbon group selected from branched alkyl, branched alkenyl, cycloalkyl or cycloalkenyl or (2) a secondary or tertiary alcohol. In any event, the ethoxylate of this invention does not contain an aromatic group. The number of ethylene oxide units in the hydrophilic portion of the molecule may comprise either a broad or narrow monomodal distribution as typically supplied or a broader or bimodal distribution which may be obtained by blending. Such non-ionic surfactants are commercially available from "TERGITOL TMN-6" and "TERGITOL TMN-10" from Dow Chemical Corporation.

The amount of fluoropolymer solids in the dispersion may be upconcentrated as needed or desired to an amount between 30 and 70% by weight. Any of the known upconcentration techniques may be used including ultrafiltration and thermal upconcentration.

The following embodiments are representatives of the subject matter of the present application:

Embodiment 1. Microemulsions comprising:

(a) water;

(b) at least one ethylenically unsaturated fluoromonomer; and (c) at least one oligomeric fluorosulfinic compound.

Embodiment 2. Microemulsions according to embodiment 1 wherein the oligomeric fluorosulfinic compound is a highly fluorinated sulfinate oligomer.

Embodiment 3. Microemulsions according to embodiment 2 wherein the highly fluorinated sulfinate oligomer is selected from at least one highly fluorinated sulfinate oligomer according to the following formula (IV):

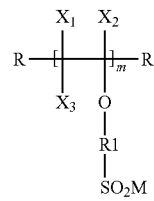

wherein $X_1$, $X_2$, and $X_3$ are independently selected from F, Cl and $CF_3$; R is independently selected from H, I, Br, linear or branched alkyl, and linear or branched fluoroalkyl group, optionally containing heteroatoms; R1 is a linear or branched perfluorinated linking group, which may be saturated or unsaturated, substituted or unsubstituted, and optionally comprises catenary heteroatoms; M is a cation; and m is at least 2.

Embodiment 4. Microemulsions according to embodiment 3 further comprising salts derived from the highly fluorinated sulfinate oligomer according to formula (IV).

Embodiment 5. Microemulsions according to any of the preceding embodiments wherein the at least one oligomeric fluorosulfinic compound further comprises a second unit according to formula (II):

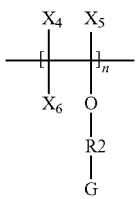

wherein $X_4$, $X_5$, or $X_6$ independently selected from H, F, Cl and $CF_3$; R2 is a linear or branched fluorinated linking group, which may be saturated or unsaturated and substituted or unsubstituted, and optionally comprises catenary heteroatoms; G is selected from a perfluoroalkyl and a functional group; n is at least 1; and wherein $X_4$, $X_5$, $X_6$, G and R2 are selected such that a resulting unit according to formula (II) is different than a resulting unit according to formula (I).

Embodiment 6. Microemulsions according to embodiment 5 wherein the functional group is selected from carboxylic acids and derivatives thereof, nitriles, sulfonyl halides, sulfonates, imidates, amidines, alcohols, mercaptans, and combinations thereof.

Embodiment 7. Microemulsions according to embodiments 5 or 6 wherein the functionalized perfluorovinyl ether according to formula (II) wherein when the functional group is a carboxylic acid derivative, the functional group is reduced to provide an alcohol derivative.

Embodiment 8. Microemulsions according to embodiment 1 wherein the oligomeric fluorosulfinic compound is partially fluorinated.

Embodiment 9. Microemulsions according to embodiment 8 wherein the partially fluorinated sulfinate oligomer is selected from at least one partially fluorinated sulfinate oligomer according to the following formula (VI):

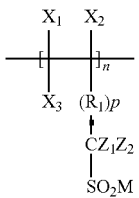

wherein $X_1$, $X_2$, and $X_3$ are independently selected from H, F, Cl, Br, I, $CF_3$, and $CH_3$ and wherein at least one of $X_1$, $X_2$, or $X_3$ is H; $R_1$ is a linking group, $Z_1$ and $Z_2$ are independently selected from Br, Cl, I, F, $CF_3$, and a perfluoroalkyl group; M is a cation; p is 0 or 1; and n is at least 2.

Embodiment 10. Microemulsions according to embodiments 8 or 9 wherein the partially fluorinated sulfinate oligomers further comprise:

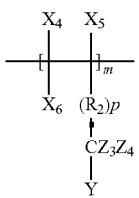

wherein $X_4$, $X_5$, and $X_6$ are independently selected from H, F, Cl, Br, I, $CF_3$, and $CH_3$; $R_2$ is a linking group; $Z_3$ and $Z_4$ are independently selected from Br, Cl, F, $CF_3$, and a perfluoroalkyl group; Y is selected from —H, —Br, —COOM, —$SO_3M$, and —$[CX_1X_3—CX_2(R_1CZ_1Z_2Y_1)]q$, a linear or branched fluorinated group, which may be saturated or unsaturated and substituted or unsubstituted, and optionally comprises catenary heteroatoms; where $Y_1$ is selected from —H, —Br, —COOM, —$SO_3M$, —$SO_2M$, and —$[CX_1X_3—CX_2(RiCZ_1Z_2Y_1)]q$; $Z_1$ and $Z_2$ are independently selected from Br, Cl, I, F, $CF_3$, and a perfluoroalkyl group; M is a organic cation; p is 0 or 1; and m is at least 1 and q is at least 1.

Embodiment 11. Microemulsions according to any of the preceding embodiments wherein the at least one oligomeric fluorosulfinic compound further comprises a monomer to provide a structure according to formula (III):

wherein Z is derived from monomers selected from ethylene, propylene, tetrafluoroethylene, chlorotrifluoroethylene, hexafluoropropylene, vinylidene fluoride, vinyl fluoride, fluorinated alkyl vinyl ethers, fluorinated alkoxy vinyl ethers, fluorinated vinyl containing a functional group, perfluoro-1,3-dioxoles, and combinations thereof, and further wherein p is at least one.

Embodiment 12. Microemulsions according to any of the preceding embodiments wherein R1 and R2 are independently selected from: —$(CF_2)_a$—, —$(CF_2)_a$—O—$(CF_2)_b$—, —$(CF_2)_a$—[O—$(CF_2)_b]_c$—, —$(CF_2)_a$—[O—$(CF(CF_3)CF_2)_b]_c$—, and —$[(CF_2)_a$—O—$]_b$—$[(CF_2)_c$—O—$]_d$—, and combinations thereof, wherein a, b, c, and d are independently at least 1.

Embodiment 13. Microemulsions according to any of the preceding embodiments, wherein R1 and R2 are independently selected from: —$CF_2CF_2$—, —$CF_2CF_2CF_2CF_2$—, —$CF_2CF_2OCF_2CF_2$—, —$CF_2CF(CF_3)$—O—$CF_2CF_2$—.

Embodiment 14. Microemulsions according to any of the preceding embodiments wherein the at least one oligomeric fluorosulfinic compound has a number average molecular weight of no more than 20,000 grams/mole.

Embodiment 15. Microemulsions according to any of the preceding embodiments wherein M is selected from: $H^+$, $NH_4^+$, $PH_4^+$, $H_3O^+$, $Na^+$, $Li^+$, $Cs^+$, $Ca^{+2}$, $K^+$, $Mg^{+2}$, $Zn^{+2}$, and $Cu^{+2}$, and/or an organic cation including, but not limited to $N(CH_3)_4^+$, $NH_2(CH_3)_2^+$, $N(CH_2CH_3)_4^+$, $NH(CH_2CH_3)_3^+$, $NH(CH_3)_3^+$, $((CH_3CH_2CH_2CH_2)_4)P^+$, and combinations thereof.

Embodiment 16. Microemulsions according to any one of the preceding embodiments, wherein the at least one oligomeric fluorosulfinic compound is water soluble.

Embodiment 17. Microemulsions comprising:
(a) water;
(b) at least one ethylenically unsaturated fluoromonomer; and
(c) at least one ethylenically unsaturated, polymerizable monomeric fluorosulfinic compound.

Embodiment 18. A microemulsion according to embodiment 17 wherein the at least one ethylenically unsaturated, polymerizable monomeric fluorosulfinic compound is selected from a highly fluorinated vinylether sulfinate according to formula VII:

wherein $X_1$, $X_2$, and $X_3$ are independently selected from F, Cl, and $CF_3$; X is F or a linear or branched perfluorinated alkyl group; and R is a linear or branched perfluorinated linking group, which may be saturated or unsaturated, substituted or unsubstituted, and optionally comprises catenary heteroatoms; and M is a cation.

Embodiment 19. Microemulsions according to embodiment 18 wherein R—CFX group is selected from: —$CF_2CF_2$—, —$CF_2CF_2CF_2CF_2$—, —$CF_2CF_2OCF_2CF_2$—, —$CF_2CF(CF_3)$—O—$CF_2CF_2$— and $X_1$, $X_2$, and $X_3$ is fluorine.

Embodiment 20. Microemulsions according to embodiment 17 wherein the at least one ethylenically unsaturated, polymerizable monomeric fluorosulfinic compound is selected from at least one ethylenically unsaturated, polymerizable monomeric fluorosulfinic compound according to formula VIII:

$$CX_1X{=}CX_2{-}(R_1)_p{-}CZ1Z2{-}SO_2M \quad (VIII)$$

wherein $X_1$, $X_2$, and $X_3$ are independently selected from H, F, Cl, Br, I, $CF_3$ and $CH_3$, and wherein at least one of $X_1$, $X_2$, or $X_3$ is a H; $R_1$ is a linking group; Z1 and Z2 are independently selected from F, Cl, Br, I, $CF_3$, and a perfluoroalkyl group; p is 0 or 1; and M is a cation.

Embodiment 21. Microemulsions according to embodiment 20, wherein $X_1$, $X_2$, and $X_3$ are all H and $R_1$ is a perfluorinated group.

Embodiment 22. Microemulsions according to embodiments 20 or 21, wherein the composition comprises formula VIIIa or VIIIb:

$$CH_2{=}CH{-}(CF)_4{-}SO_2M \quad (VIIIa); and$$

$$CH_2{=}CH{-}(CF_2)_2O(CF_2)_2{-}SO_2M \quad (VIIIb);$$

where M is a cation.

Embodiment 23. Microemulsions according to any of the preceding embodiments further comprising an oxidizing agent.

Embodiment 24. Microemulsions according to embodiment 23 wherein the oxidizing agent is selected from at least one of sodium persulfates, potassium persulfates, ammonium persulfates, perphosphates, perborates, percarbonates, chlorate ions, bromate ions and hypochlorite ions.

Embodiment 25. Microemulsion according to any of the preceding embodiments wherein the amount of the oligomeric fluorosulfinic compound or ethylenically unsaturated, polymerizable monomeric fluorosulfinic compound is between 0.001 and 5% by weight based on the amount of water in the aqueous phase of the microemulsion.

Embodiment 26. Microemulsion according to any of the preceding embodiments further comprising one or more fluorinated surfactants.

Embodiment 27. Microemulsion according to embodiment 26 wherein said fluorinated surfactants comprise perfluorinated polyether surfactants.

Embodiment 28. Microemulsion according to any of the preceding embodiments further comprising fluoropolymer particles.

Embodiment 29. Method for making a fluoropolymer comprising aqueous emulsion polymerization of the microemulsion according to any of the preceding embodiments.

Embodiment 30. A fluoropolymer derived from microemulsions according to any of the preceding embodiments.

EXAMPLES

These examples are merely for illustrative purposes only and are not meant to be limiting on the scope of the appended claims. All parts, percentages, ratios, etc. in the examples and the rest of the specification are by weight, unless noted otherwise. These abbreviations are used in the following examples: g=grams, min=minutes, hr=hour, sec=second, mL=milliliter, L=liter, s=seconds. Solvents and other reagents used were obtained from Sigma-Aldrich Chemical Company; Milwaukee, Wis. unless otherwise noted.

Materials

| Material | Source |
| --- | --- |
| MV4S | $CF_2{=}CF{-}O{-}C_4F_8{-}SO_2F$, made as described in the Example (section A to C) of U.S. Pat. No. 6,624,328 (Guerra) |
| LUPEROX 575 | t-amyl-2-ethyl hexanoate peroxide, commercially available from Arkema, Philadelphia, PA |
| MV31 | $CF_2{=}CF{-}O{-}C_3F_6{-}O{-}CF_3$ made as per Example 8 of U.S. Pat. No. 6,255,536 (Worm et al.) |
| MV3b2S | $CF_2{=}CF{-}O{-}CF_2CF(CF_3){-}OC_2F_4{-}SO_2F$, Perfluoro(4-methyl-3,6-dioxaoct-7-ene)sulfonyl fluoride available from SynQuest Lab, Alachua FL. |
| C4 monosulfinate | $C_4F_9SO_2H$, made as described in Example 1 of U.S. Pat. No. 6,462,228 (Dams) |
| C3 disulfinic acid | $HO_2SC_3F_6SO_2H$, made as described in Example 13 except $FSO_2C_3F_6SO_2F$ was the starting perfluoro disulfonyl fluoride of U.S. Pat. No. 6,462,228 (Dams) |
| o-MV4S | R—[$CF_2CF(OC_4F_8SO_2F)$]n—R where n = 2-5 and R can be $C_4F_9$, I, H, $C_2H_5$ and/or $C_7H_{15}$ |
| o-MV4SO2H | R—[$CF_2CF(OC_4F_8SO_2H)$]n—R where n = 2-5 and R can be $C_4F_9$, I, H, $C_2H_5$ and/or $C_7H_{15}$ |
| o-MV4SO2NH4 | R—[$CF_2CF(OC_4F_8SO_2NH_4)$]n—R where n = 2-5 and R can be $C_4F_9$, I, H, $C_2H_5$ and/or $C_7H_{15}$ |
| o-MV3b2S | R—[$CF_2CF(OCF_2CF(CF_3)OC_2F_4SO_2F)$]n—R where n = 2-5 and R can be H, $C_2H_5$ and/or $C_7H_{15}$ |
| o-MV3b2SO2H | R—[$CF_2CF(OCF_2CF(CF_3)OC_2F_4SO_2H)$]n—R where n = 2-5 and R can be H, $C_2H_5$ and/or $C_7H_{15}$ |
| o-MV3b2SO2NH4 | R—[$CF_2CF(OCF_2CF(CF_3)OC_2F_4SO_2NH_4)$]n—R where n = 2-5 and R can be H, $C_2H_5$ and/or $C_7H_{15}$ |
| ADONA | $CF_3OCF_2CF_2CF_2OCFHCF_2CO_2NH_4$. Ether acid salt prepared as described in U.S. Pat. No. 7,671,112 (Hintzer et al.) as Compound 11. |

Preparation of Sulfinate Oligomer 1

Oligomerization of $CF_2=CF-O-C_4F_8-SO_2F$ (MV4S) was done in a 600 ml PARR reactor by charging 200 g MV4S and 20 g LUPEROX 575 and reacting for 20 hours at 65° C. Vacuum distillation removed the lower boiling cut and the product remaining in the pot had a boiling point greater than 220° C. at 5 mm vacuum. Reduction of 25 g of oligomeric MV4S (o-MV4S) with 6 g NaBH4 in 100 g tetrahydrofuran (THF) was done for one hour at 65° C. The mixture was cooled down and 14 g of concentrated sulfuric acid in 200 g water was added. The product top phase was vacuum stripped to remove solvent and the product was dissolved in 50 g methanol, filtered and vacuum stripped to yield 25 g of oligomeric multisulfinic acid (o-MV4SO2H) which was made into a 50% aqueous solution. A 5 g sample was neutralized with 27% ammonium hydroxide and vacuum dried to a solid. Surface tension measurement is given below for the fluoro oligomeric multisulfinic acid ammonium salt (o-MV4SO2NH4).

Preparation of Sulfinate Oligomer 2

Oligomerization of $CF_2=CF-O-CF_2CF(CF_3)-O-CF_2CF_2-SO_2F$ (MV3b2S) was done in a 600 ml PARR reactor by charging 50 g MV3b2S, 7 g LUPEROX 575 and 196 g of tetrachlorohexafluorobutane solvent and reacting for 20 hours at 65° C. Vacuum distillation removed the lower boiling cut and the product remaining in the pot had a boiling point greater than 225° C. at 15 mm vacuum. Reduction of 6 g of oligomeric MV3b2S (o-MV3b2S) with 1.5 g $NaBH_4$ in 20 g THF was done for one hour at 65° C. The mixture was cooled down and 10 g of concentrated sulfuric acid in 50 g water was added. The product top phase was vacuum stripped to remove solvent and the product was dissolved in 50 g methyl-t-butyl ether (MTBE), filtered and vacuum stripped to yield 5 g of oligomeric multisulfinic acid (o-MV3b2SO2H). A 5 g sample was neutralized with 27% ammonium hydroxide and vacuum dried to a solid. Surface tension measurement is given below for the fluoro oligomeric multisulfinic acid ammonium salt (o-MV3b2SO2NH4).

Preparation of Sulfinate Oligomer 3

Poly-sulfinate was prepared by reaction of 4-bromotetrafluorobutene ($CH_2=CHCF_2CF_2Br$) with $Na_2S_2O_4$. 138 g deionized water, 123 g acetonitrile ($CH_3CN$) and 25.6 g $NaHCO_3$ (0.305 mol), were charged into a 600 mL PARR reactor. The solution was bubbled with nitrogen gas for 2 minutes to remove oxygen. The following materials were then added in order under a nitrogen atmosphere: 50 g $BrCF_2CF_2CH=CH_2$ (0.24 mol) followed with 53.2 g $Na_2S_2O_4$ (0.26 mol) in 4 portions for slow release of generated gas during the addition. The reactor was sealed after addition, and the solution was heated to 60° C. and reacted at 60° C. (internal temperature) for 15 hours. After cooling to 20° C., the pressure was released and the reaction mixture had two separated phases with some solid. 294.8 g liquid was collected after filtration to remove solid. From $^{19}F$ NMR (nuclear magnetic resonance spectroscopy) analysis of the filtered solution above, very complicated signals were observed between 113 and 134 ppm (chemical shift) indicating the presence of a $-CF_2SO_2Na$ group (normally around −130 ppm). Small signals were also seen for $-CF_2Br$ and $-CF_2H$. The filtered solution from above was acidified with 1N HCl solution and the solvents were stripped off. The resulting solid was extracted with diethyl ether (five times with 100 g portions). The combined ether extraction solutions were washed with water (two times with 50 g portions). After stripping off the solvent and drying under full vacuum at room temperature overnight, 30.32 g of a red semi-solid was isolated. From FT-IR (Fourier Transform-Infrared) analysis, no double bond signal of $CH_2=CH-$ was observed indicating the oligomerization of the double bond. This solid then was dispersed in water. No unreacted $CH_2=CH-$ was observed from $^1H$ NMR analysis. GPC (gel permeation chromatography, which are expressed in Dalton relative to polystyrene standards in tetrahydrofuran) showed Mn (number average molar mass)=1400 Dalton, Mw (weight average molar mass)=1600 Dalton, and polydispersity (PD)=1.2.

Preparation of Sulfinate Oligomer 4

138 g deionized water, 100 g $CH_3CN$ and 25 g $NaHCO_3$ was charged into a 600 ml PARR reactor. The solution was bubbled with nitrogen gas for 2 minutes to free oxygen. 50 g $BrCF_2CF_2CH=CH_2$ and 10 g $C_4F_9CH=CH_2$ were then added under a nitrogen atmosphere, followed by 58 g $Na_2S_2O_4$. The reactor was sealed and reacted at 60° C. (internal temperature) for 24 hours. After cooling to 20° C., the remaining pressure was released, and 353 g liquid (2 phases) with some solids was obtained. The solution was filtered to remove solids and 115 g of the top clear solution was isolated. By $^{19}F$ NMR fluorinated products were seen in the upper phase, but not the lower phase. Rotary evaporation to remove solvent of the upper phase yielded 33 g of a semisolid. This semisolid was acidified with $2NH_2SO_4$ to pH ~1, and then extracted twice with 200 mL t-$BuOCH_3$. Solvent was removed from the extracts by rotary evaporation and then the remaining liquid was dried under full vacuum overnight to yield 31.26 g of a clear liquid. From $^{19}F$ NMR analysis, a clear $CF_3-$ signal from $CF_3CF_2CF_2CF_2CH=CH_2$ was observed in comparison with reaction product from pure $BrCF_2CF_2CH=CH_2$ as in Example 1, indicating the copolymerization of $CF_3CF_2CF_2CF_2CH=CH_2$ and $BrCF_2CF_2CH=CH_2$ (any unpolymerized $CF_3CF_2CF_2CF_2CH=CH_2$ should not have remained in the final product after full vacuum stripping due to its low boiling point of 58° C.). As in the $^{19}F$ NMR analysis of Example 1, very complicated signals were observed between −113 and −134 ppm. Signals of $-CF_2SO_2H$ and $-CF_2Br$ were also identified from the isolated product by $^{19}F$ NMR analysis. No $CH_2=CH-$ signal was observed from the isolated product by FT-IR and $^1$H-NMR analyses. The isolated product showed less solubility in water in comparison with that from homo-oligomerization of $BrCF_2CF_2CH=CH_2$ as further evidence of the co-oligomerization with $CF_3CF_2CF_2CF_2CH=CH_2$. GPC analysis showed Mn=810 Dalton, Mw=990 Dalton, and PD=1.2.

Preparation of Sulfinate Oligomer 5

$BrCF_2CF_2CH=CH_2$ and $CF_3OCF_2CF_2CF_2OCF=CF_2$ (MV-31) reacted with $Na_2S_2O_4$ 50 g $BrCF_2CF_2CH=CH_2$ and 10 g of $CF_3OCF_2CF_2CF_2OCF=CF_2$ (MV-31) was reacted with 58 g $Na_2S_2O_4$ and 25 g $NaHCO_3$ in 138 g $H_2O$ and 100 g $CH_3CN$ at 60° C. for 24 hours in a 600 ml PARR reactor. 33.58 g liquid product was isolated following filtration, phase separation, acidification, extraction, and drying. As in the $^{19}F$ NMR analysis of example 1, very complicated signals were observed between −113 and −134 ppm. From $^{19}F$ NMR analysis new signals of $CF_3OCF_2-$ from $CF_3OCF_2CF_2CF_2OCF=CF_2$ were observed in comparison with reaction product from pure $BrCF_2CF_2CH=CH_2$ as in Example 1 indicating the copolymerization of $CF_3OCF_2CF_2CF_2OCF=CF_2$ and $BrCF_2CF_2CH=CH_2$ (any unpolymerized $CF_3OCF_2CF_2CF_2OCF=CF_2$ should not have remained after vacuum stripping). Signals of —$CF_2SO_2H$ and —$CF_2Br$ were also identified from the isolated product. No unreacted $CH_2=CH$— signal was observed from the isolated product by FT-IR and $^1$H-NMR analyses. GPC analysis showed Mn=620 Dalton, Mw=830 Dalton, and PD=1.5.

Preparation of Sulfinate Oligomer 6

50 g MV4S was oligomerized with 6.21 g tert-amyl-2-ethylhexyl monoperoxycarbonate, commercially available under the trade designation "LUPEROX TAEC" from Arkema Inc., Philadelphia, Pa., at 120° C. under nitrogen for 24 hours. The low boiling fractions were stripped out at 120° C. under vacuum to yield 31 g of a viscous liquid with a 62% isolated yield. FTIR showed a signal at 2968 cm$^{-1}$ for CH from the hydrocarbon initiator and strong signals at 1463, 1349, 1212, 1148 and 1072 cm$^{-1}$ for C—F and —$SO_2F$ groups. $^{19}$F NMR showed no signal for a CF=CFO— group, two signals for —$CF_2O$— at −81 and −87 ppm, a $SO_2F$ signal at +43 ppm, —$CF_2SO_2F$ signal at −110 ppm, and $CF_2CF_2$— signals at −123 and −128. The oligomerized vinyl signals of —($CF_2CF(O$—)— were seen at −121 and −147 ppm with complicated multiplets. From Liquid Chromatography Mass Spectroscopy (LCMS) analysis the oligomer had an average of 3.2 units and a MW of 1320.

25.6 g of the above viscous oligomer liquid (~0.067 eq —$SO_2F$) in 37 g THF solvent was treated with 0.5 g $NaBH_4$ (0.0132 mol) at −5 to 10° C. under nitrogen for 20 minutes followed by reaction at 20° C. for 2 additional hours. $^{19}$F NMR indicated 20% —$SO_2F$ (+43 ppm) was reacted to give the corresponding —$SO_2M$, the corresponding signal of —$CF_2SO_2F$ at −111 ppm was decreased and a new signal at −132 ppm for —$CF_2SO_2M$ appeared. 0.28 g $NaBH_4$ (total 0.78 g, 0.0206 mole) was added at −5 to 10° C. over 20 minutes followed by reaction at 20° C. for 2 hours. The convesion was increased to 36%. Repeating the addition of $NaBH_4$ a third time the conversion was increased to 50% when 1.1 g of total $NaBH_4$ (0.029 mol) was added. $^{19}$F NMR indicated —$OCF_2CF_2CF_2CF_2SO_2M$ with chemical shifts at −126, −128 and −132, and —$OCF_2CF_2CF_2CF_2SO_2F$ with chemical shifts at −123, −128 and −111 ppm. The remaining signal of —$SO_2F$ was seen at +42 ppm.

Five grams water was added with stirring to the above partially reduced oligomer solution in THF to destroy any unreacted reducing agent. This solution was then treated with 10% KOH aqueous solution at 20° C. while stirring until the pH of solution was basic (pH>9). The solution was stirred at 20° C. for another 30 minutes. $^{19}$F NMR indicated the —$SO_2F$ signal at +42 ppm had completely disappeared. After acidification of the solution with 2N $H_2SO_4$ to pH<2 the mixture was extracted with t-BuOMe (3×50 mL). After stripping out the solvent 32 g of a wet product was obtained. The wet product was dissolved in 20 g water. $^{19}$F NMR analysis of the solution indicated about 50 wt % solids and a ratio of —$CF_2SO_2H$ (−132 ppm) and —$CF_2SO_3H$ (−111 ppm) of 54:46.

Preparation of Sulfinate Oligomer 7

50 g $BrCF_2CF_2CH=CH_2$ and 10 g of MV4S was reacted with 58 g $Na_2S_2O_4$ and 25 g $NaHCO_3$ in 138 g $H_2O$ and 100 g $CH_3CN$ at 60° C. for 24 hours in a 600 ml PARR pressure reactor. 38 g of a liquid product was isolated following filtration, phase separation, acidification, extraction and drying. As in the $^{19}$F NMR analysis of example 1, very complicated signals were observed between −113 and −134 ppm. A small amount —$CF_2Br$ was also identified. In addition, a new signal of —$OCF_2$— from $CF_2=CFOCF_2(CF_2)_3SO_2F$ was observed at −87 ppm in comparison with reaction product from pure $BrCF_2CF_2CH=CH_2$ as in Example 1 supporting the co-oligomerization of $CF_2=CFO(CF_2)_4SO_2F$ with $BrCF_2CF_2CH=CH_2$. Also the —$SO_2F$ signal at +43 ppm disappeared and an extra strong —$CF_2SO_2H$ signal was observed, indicating the conversion of —$SO_2F$ to —$SO_2H$ during the reaction. No double bond signal was observed from the isolated product by FT-IR analysis, indicating the oligomerization of $CH_2=CH$— and $CF_2=CFO$— groups.

Preparation of Sulfinate Monomer 1

In a 3 L 3-neck round bottom flask was added 255 g (0.67 mol) $CF_2=CF$—O—$C_4F_8$-SO2F, MV4S and 600 ml of reagent grade ethanol solvent. The solution was stirred and cooled to 0° C. Addition of 44 g (1.16 mol) NaBH4 was added in portions over 2 hours with a 5° C. exothermic temperature rise per portion. The reaction was kept under 10° C. throughout the addition of NaBH4. The flask was allowed to warm to room temperature and the slurry was stirred for 30 minutes. Addition of 250 g concentrated sulfuric acid in 1250 g water was added slowly with a temperature rise of 32° C. A charge of 500 g of MTBE was used to extract the top product phase. The solvent was vacuum stripped and the solids were removed by filtration. A yield of perfluorovinyl ether sulfinic acid (MV4SO2H) of 212 g was isolated and 110 g of MV4SO2H was titrated with 19 g of 27% ammonium hydroxide in 75 g of water. A quantitative yield of solid perfluorovinyl ether sulfinic acid ammonium salt (MV4SO2NH4) was isolated after vacuum stripping and had the surface tension measured.

Preparation of Sulfinate Monomer 2

In a 1 L 3-neck round bottom flask was added 45 g (0.10 mol) $CF_2=CF$—O—$CF_2CF(CF_3)$—$C_2F_4$—$SO_2F$ (MV3b2S) and 180 ml of reagent grade ethanol solvent. The solution was stirred and cooled to 0° C. Addition of 6.9 g (0.18 mol) $NaBH_4$ was added in portions over 30 minutes with a slight exothermic temperature rise per portion. The reaction was kept under 10° C. throughout the addition of $NaBH_4$. The flask was allowed to warm to room temperature and the slurry was stirred for 30 minutes. Addition of 50 g concentrated sulfuric acid in 250 g water was added slowly with a temperature rise of 39° C. A charge of 150 g of MTBE was used to extract the top product phase. The solvent was vacuum stripped and the solids were removed by filtration. A yield of perfluorovinyl ether sulfinic acid (MV3b2SO2H) of 42 g was isolated and 10 g of MV3b2SO2H was titrated with 1.5 g of 27% ammonium hydroxide in 10 g of water. A quantitative yield of solid perfluorovinyl ether sulfinic acid ammonium salt (MV3b2SO2NH4) was isolated after vacuum stripping and had the surface tension measured.

Preparation of Sulfinate Monomer 3

In a 600 mL PARR pressure reactor, 223 g $I(CF_2)_4I$ (MW=454, 0.491 mol) was reacted with 15.4 g $CH_2=CH_2$ (MW=28, 0.55 mol, charged in portions) in the presence of 4.58 g Initiator at 60° C. for 24 hours under 60 psi (414 kPa) or less. $^{19}$F NMR analysis of the reaction mixture showed 50% unreacted $I(CF_2)_4I$, 43% $ICH_2CH_2CF_2CF_2CF_2CF_2I$ and 7% ICH$_2$CH$_2$CF$_2$CF$_2$CF$_2$CF$_2$CH$_2$CH$_2$I. Distillation of the reaction mixture at normal pressure recovered 70 g pure I(CF$_2$)$_4$I (31.4%) and 16.5 g of a mixture of I(CF$_2$)$_4$I and ICH$_2$CH$_2$CF$_2$CF$_2$CF$_2$CF$_2$I (MW=482). Distillation in vacuum, 79.1 g of ICH$_2$CH$_2$CF$_2$CF$_2$CF$_2$CF$_2$I (MW=482, which equates to about a 33.4% isolated yield) was isolated with boiling point of 88~91° C./7~7.5 mmHg. GC (gas chromatography) analysis showed 95% purity. From the remaining solid residue, 12 g ICH$_2$CH$_2$CF$_2$CF$_2$CF$_2$CF$_2$CH$_2$CH$_2$I was isolated after purification by recrystallization from hexane (m.p. 96~97° C.). $^{19}$F NMR for ICH$_2$CH$_2$CF$_2$CF$_2$CF$_2$CF$_2$I, -57 (m, —CF$_2$I), -111 (m, 2F), -113 (m, 2F), and -121 (t, —CF$_2$CH$_2$—) ppm.

Under nitrogen, 50 g of the above distilled ICH$_2$CH$_2$CF$_2$CF$_2$CF$_2$CF$_2$I (MW=482, 95%, 0.1 mol) was treated with 26 g Na$_2$S$_2$O$_4$ (MW=174, 91%, 0.136 mol) and 13 g NaHCO$_3$ (MW=84, 0.154 mol) in 50 g CH$_3$CN and 68 g H$_2$O at room temperature for 2 hours. $^{19}$F NMR showed complete conversion of —CF$_2$I (-67 ppm) to form the corresponding —CF$_2$SO$_2$Na at ~130 ppm yielding the desired ICH$_2$CH$_2$(CF$_2$)$_4$SO$_2$Na. The mixture was filtered to remove solids. The filtered solution showed two phases, and only top phase showed fluorinated product based on $^{19}$F NMR analysis. The top phase was separated, and the solvents were removed by rotary evaporation to give 76.5 g wet solid. The wet solid was dissolved in water and the following chemical shifts were recorded, -115 (dxt), -122 (m), -124 (m) and -130 (dxt) ppm. No effect on ICH$_2$CH$_2$— was observed during the dehalosulfination based $^1$H NMR analysis (2.5-3 ppm multiplet for —CH$_2$I and 3.2 ppm (txm) for —CH$_2$CF$_2$—).

The ICH$_2$CH$_2$(CF$_2$)$_4$SO$_2$Na solid from part II above was dissolved in ethanol and treated with 8.7 g KOH (MW=56, 85%, 0.132 mol) at room temperature, then at 50° C. for 8 hours to precipitate a solid. The reaction mixture was cooled to 20° C. and filtered to remove solids. No significant change in $^{19}$F NMR was observed. The solvent was stripped and the resulting solid was acidified with 2NH$_2$SO$_4$ to a pH<2. The acidified solution was extracted with t-BuOMe (three times, 100 mL each) and the combined ether solution was dried over MgSO$_4$. Finally, the solution was filtered and the solvent was stripped to yield 28 g of the desired semisolid product, CH$_2$=CH(CF$_2$)$_4$SO$_2$H (MW=292), which is soluble in water. The structure of the product was confirmed by NMR analyses, $^{19}$F NMR, -115 (m, =CHCF$_2$—), -122 (txm), -125 (txm) and -130 (t, —CF$_2$SO$_2$H); $^1$H NMR, 4.4~5.6 (m) ppm, indicating no more ICH$_2$CH$_2$— signal. However, ethanol residue was observed in final product, which can be eliminated by fully drying the solid before acidification from a repeated preparation.

Polymerization Example 1

A 4 liter reactor was charged with 2,590 g of water, 2 g of ammonium persulfate (APS, (NH$_4$)$_2$S$_2$O$_8$) with 50 g of water, 4 g of potassium phosphate dibasic (K$_2$HPO$_4$) with 50 g of water and a mixture of 6.3 g of 50% of "Sulfinate Oligomer 1" and 1.1 g of 28% NH$_4$OH. The mole ratio of the mixture was 1:1. The reactor was evacuated, the vacuum was broken and it was pressurized with nitrogen to 25 psi (0.17 MPa). This vacuum and pressurization was repeated three times. After removing oxygen, the reactor was heated to 80° C. and pressurized to 82 psi (0.51 MPa) with a blend of hexafluoropropylene (HFP), 1,4-diiodooctafluorobutane (available from SynQuest Labs Inc., Alachua, Fla.) and 3-ethoxydodecafluoro-2-trifluoromethyl-hexane (available as HFE 7500 from 3M Co., St. Paul, Minn.). To prepare the blend of hexafluoropropylene (HFP), 1,4-diiodooctafluorobutane and HFE 7500, a 1-liter, stainless steel cylinder was evacuated and purged 3 times with N$_2$. After adding 1,4-diiodooctafluorobutane and HFE 7500 to the cylinder, HFP was added based on the amount of 1,4-diiodooctafluorobutane added. The blend was then attached to the reactor and was fed using a blanket of N$_2$. The blend contained 97.3 wt % of HFP, 1.4 wt % of 1,4-diiodooctafluorobutane and 1.4 wt % of HFE 7500. The reactor was then charged with vinylidene fluoride (VDF) and the above described blend of hexafluoropropylene (HFP), 1,4-diiodooctafluorobutane and HFE 7500, bringing reactor pressure to 220 psi (1.52 MPa). Total precharge of VDF and the blend of HFP, 1,4-diiodooctafluorobutane and HFE 7500 was 99 g, and 179 g, respectively. The reactor was agitated at 650 rpm. As reactor pressure dropped due to monomer consumption in the polymerization reaction, the blend of hexafluoropropylene (HFP), 1,4-diiodooctafluorobutane and HFE 7500, and VDF was continuously fed to the reactor to maintain the pressure at 220 psi (1.52 MPa). The ratio of the blend and VDF was 0.691 by weight After 4.3 hours the monomer and blend feeds were discontinued and the reactor was cooled. The resulting dispersion had a solid content of 33.4 wt. % and a pH of 3.6. The dispersion particle size was 50 nm and total amount of dispersion was about 3,986 g.

For the coagulation, 3000 g of the dispersion made as described above was added to 3038 g of a 1.25 wt % aqueous solution of MgCl$_2$. The crumb was recovered by filtering the coagulate through cheese cloth and gently squeezing to remove excess water. The crumb was returned to the coagulation vessel and rinsed with deionized water a total of 4 times. After the final rinse and filtration, the crumb was dried in a 130° C. oven for 16 hours. The resulting fluoroelastomer raw gum had a Mooney viscosity of 34 at 121° C. The fluoroelastomer by FT-IR analysis contained 77.6 mol % copolymerized units of VDF and 22.4 mol % HFP. The fluorine content was 66.1 wt %. Mooney viscosity was determined in accordance with ASTM D1646-06 TYPE A by a MV 2000 instrument (available from Alpha Technologies, Akron, Ohio) using large rotor (ML 1+10) at 121° C. Results are reported in Mooney units.

Polymerization Example 2

A 4 liter reactor was charged with 2,590 g water, 2 g ammonium persulfate (APS, (NH$_4$)$_2$S$_2$O$_8$) with 50 g water, 4 g potassium phosphate dibasic (K$_2$HPO$_4$) with 50 g of water and a mixture of 4.0 g of 50% of "Sulfinate Oligomer 3" and 2.2 g of 28% NH$_4$OH. The mole ratio of the mixture was 1:1. The reactor was evacuated, the vacuum was broken and it was pressurized with nitrogen to 25 psi (0.17 MPa). This vacuum and pressurization was repeated three times. After removing oxygen, the reactor was heated to 80° C. and pressurized to 82 psi (0.51 MPa) with a blend of hexafluoropropylene (HFP), 1,4-diiodooctafluorobutane (available from SynQuest Labs Inc., Alachua, Fla.) and 3-ethoxydodecafluoro-2-trifluoromethyl-hexane (available as HFE 7500 from 3M Co., St. Paul, Minn.). To prepare the blend of hexafluoropropylene (HFP), 1,4-diiodooctafluorobutane and HFE 7500, a 1-liter, stainless steel cylinder was evacuated and purged 3 times with N$_2$. After adding 1,4-diiodooctafluorobutane and HFE 7500 to the cylinder, HFP was added based on the amount of 1,4-diiodooctafluorobutane added. The blend was then attached to the reactor and was fed using a blanket of N$_2$. The blend contained 97.2 wt % of HFP, 1.4 wt % of 1,4-diiodooctafluorobutane and 1.4 wt % of HFE 7500. The reactor was then charged with vinylidene fluoride (VDF) and the above described blend of hexafluoropropylene (HFP), 1,4-diiodooctafluorobutane and HFE 7500, bringing reactor pressure to 220 psi (1.52 MPa). Total precharge of VDF and the blend of HFP, 1,4-diiodooctafluorobutane and HFE 7500 was 99 g, and 179 g, respectively. The reactor was agitated at 650 rpm. As reactor pressure dropped due to monomer consumption in the polymerization reaction, the blend of hexafluoropropylene (HFP), 1,4-diiodooctafluorobutane and HFE 7500, and VDF was continuously fed to the reactor to maintain the pressure at 220 psi (1.52 MPa). The ratio of the blend and VDF was 0.691 by weight and no emulsifier was used for the polymerization. After 5.6 hours the monomer and blend feeds were discontinued and the reactor was cooled. The resulting dispersion had a solid content of 30.4 wt. % and a pH of 3.8. The dispersion particle size was 177 nm and total amount of dispersion was about 3,857 grams.

For the coagulation, 3000 g of the dispersion made as described above was added to 3038 g of a 1.25 wt % aqueous solution of $MgCl_2$. The crumb was recovered by filtering the coagulate through cheese cloth and gently squeezing to remove excess water. The crumb was returned to the coagulation vessel and rinsed with deionized water a total of 4 times. After the final rinse and filtration, the crumb was dried in a 130° C. oven for 16 hours. The resulting fluoroelastomer raw gum had a Mooney viscosity of 12.3 at 100° C. The fluoroelastomer by FT-IR analysis contained 79.8 mol % (62.7 wt %) copolymerized units of VDF and 20.2 mol % (37.3 wt %) copolymerized units of HFP. The fluorine content was 65.5 wt %. Mooney viscosity was determined in accordance with ASTM D1646-06 TYPE A by a MV 2000 instrument (available from Alpha Technologies, Akron, Ohio) using large rotor (ML 1+10) at 121° C. Results are reported in Mooney units.

Polymerization Example 3

A 4 liter reactor was charged with 2,250 g water, 1.7 g diethyl malonate (DEM), and an aqueous solution containing 5.2 g ammonium persulfate (APS, $(NH_4)_2S_2O_8$), 5.0 g potassium phosphate dibasic ($K_2HPO_4$), and 4.4 g "Sulfinate Monomer 1" (solid ammonia neutralized form) in 100 g water. Containers from which the solid reagents were added were rinsed, and the rinse water, totaling 325 g, was added to the reactor. The reactor was evacuated, the vacuum was broken and the vessel was pressurized with nitrogen to 25 psi (0.17 MPa). This evacuation and pressurization cycle was repeated three times. After removing oxygen, the reactor was heated to 73.9° C. and pressurized with 22 g hexafluoropropylene (HFP). The reactor was then charged with 139 g vinylidene fluoride (VDF) and 109 g hexafluoropropylene (HFP). The reactor was agitated at 650 rpm. As reactor pressure dropped due to monomer consumption in the polymerization reaction, HFP and VDF were continuously fed to the reactor to maintain the pressure at 160 psi (1.11 MPa). The ratio of HFP and VDF was 0.651 by weight. After 3.0 hours the monomer feeds were discontinued and the reactor was cooled. The resulting dispersion had a solid content of 31.0 wt % and a pH of 3.7. The mean particle size in the latex was 127 nm and the total amount of dispersion was about 3,986 g.

For the coagulation, 3000 g of the dispersion made as described above was added to 3038 g of a 1.25 wt % aqueous solution of $MgCl_2$. The crumb was recovered by filtering the coagulate through cheese cloth and gently squeezing to remove excess water. The crumb was returned to the coagulation vessel and rinsed with deionized water a total of 4 times. After the final rinse and filtration, the crumb was dried in a 130° C. oven for 16 hours. The resulting fluoroelastomer raw gum had a Mooney viscosity of 56 at 121° C. The fluoroelastomer by FT-IR analysis contained 77.3 mol % copolymerized units of VDF and 22.7 mol % HFP. The fluorine content was 66.1 wt %. Mooney viscosity was determined in accordance with ASTM D1646-06 TYPE A by a MV 2000 instrument (available from Alpha Technologies, Akron, Ohio) using large rotor (ML 1+10) at 121° C. Results are reported in Mooney units.

Polymerization Examples 4-7

Polymerizations were carried out as in Example 3, except that the amount of "Sulfinate Monomer 1" varied in each recipe. See Table 2.

Polymerization Example 8

A polymerization was carried out as in Example 3, with the exception that "Sulfinate Oligomer 1" (neutralized in situ with a solution of ammonium hydroxide) was used in place of "Sulfinate Monomer 1". Furthermore, the polymer dispersion (3000 g) was coagulated by adding it to 6300 g of a 4.8 wt % aqueous solution of $MgCl_2$. See Table 2.

Polymerization Example 9

A polymerization was carried out as in Example 3, with the exception that "Sulfinate Monomer 2" was used in place of "Sulfinate Monomer 1". See Table 2.

Polymerization Example 10

A polymerization was carried out as in Example 3, with the exception that "Sulfinate Oligomer 2" was used in place of "Sulfinate Monomer 1". Furthermore, the polymer dispersion (3000 g) was coagulated by adding it to 6300 g of a 4.8 wt % aqueous solution of $MgCl_2$. See Table 2.

Polymerization Example 11

A 4 liter reactor was charged with 2,250 g of water, 1.8 g of diethyl malonate (DEM), and an aqueous solution containing 9.7 g of ammonium persulfate (APS, $(NH_4)_2S_2O_8$), 5.3 g of potassium phosphate dibasic ($K_2HPO_4$), and 13.2 g of "Sulfinate Monomer 1" in 100 g of water. Containers from which the solid reagents were added were rinsed, and the rinse water, totaling 325 g, was added to the reactor. The reactor was then evacuated; after the vacuum was broken, the vessel was pressurized with nitrogen to 25 psi (0.17 MPa). This evacuation and pressurization cycle was repeated three times. After removing oxygen, the reactor was heated to 71.1° C. and pressurized to 40 psi (0.27 MPa) with hexafluoropropylene (HFP). The reactor was then charged with a mixture of vinylidene fluoride (VDF), hexafluoropropylene (HFP), and tetrafluoroethylene (TFE) to reach the polymerization condition of 160 psi (1.11 MPa) within the reactor. The ratio of HFP to VDF in the pressure-up was 3.24 by weight, and the ratio of TFE to VDF in the pressure-up was 1.00. The reactor was agitated at 650 rpm. As reactor pressure dropped due to monomer consumption in the polymerization reaction, HFP, VDF, and TFE were continuously fed to the reactor to maintain the pressure at 160 psi (1.11 MPa). The ratio of HFP and VDF was maintained at 1.24 by weight, while the ratio of TFE and VDF was maintained at 0.73. After 3.0 hrs the monomer feeds were discontinued and the reactor was cooled. The resulting dispersion had a solid content of 33.6 wt % and a pH of 2.7. The mean particle size in the latex was 57 nm and the total amount of dispersion was about 4,061 g.

For the coagulation, 3000 g of the dispersion made as described above was added to 3038 g of a 1.25 wt % aqueous solution of $MgCl_2$. The crumb was recovered by filtering the coagulate through cheese cloth and gently squeezing to remove excess water. The crumb was returned to the coagulation vessel and rinsed with deionized water a total of 4 times. After the final rinse and filtration, the crumb was dried in a 130° C. oven for 16 hrs.

The fluoroelastomer by FT-IR analysis contained 50.0 mol % copolymerized units of VDF, 23.9 mol % TFE, and 26.1 mol % HFP. The fluorine content was 70.4 wt %.

Polymerization Example 12

Polymerization was carried out as in Example 11, except that the amount of "Sulfinate Monomer 1" was 17.6 g. See Table 2.

Polymerization Example 13

A polymerization was carried out as in Example 11, with the exception that there was no "Sulfinate Monomer 1" in the recipe. In its place was a solution of the ammonium salt of "Sulfinate Oligomer 1". Furthermore, the polymer dispersion (3000 g) was coagulated by adding it to 6300 g of a 4.8 wt % aqueous solution of $MgCl_2$. See Table 2.

Polymerization Example 14

A 4 liter reactor was charged with 2,250 g of water, 1.5 g of diethyl malonate (DEM), and an aqueous solution containing 6.0 g of ammonium persulfate (APS, $(NH_4)_2S_2O_8$) and 8.8 g of "Sulfinate Monomer 1" in 50 g of water. Containers from which the solid reagents were added were rinsed, and the rinse water, totaling 325 g, was added to the reactor. The reactor was then evacuated; after the vacuum was broken, the vessel was pressurized with nitrogen to 25 psi (0.17 MPa). This evacuation and pressurization cycle was repeated three times. After removing oxygen, the reactor was heated to 71.1° C. and pressurized the vacuum was broken by adding 22 g of hexafluoropropylene (HFP). The reactor was then charged with a mixture of vinylidene fluoride (VDF), hexafluoropropylene (HFP), and tetrafluoroethylene (TFE) to reach the polymerization condition of 160 psi (1.11 MPa) within the reactor. The ratio of HFP to VDF in the pressure-up was 5.4 by weight, and the ratio of TFE to VDF in the pressure-up was 2.7. The reactor was agitated at 650 rpm. As reactor pressure dropped due to monomer consumption in the polymerization reaction, HFP, VDF, and TFE were continuously fed to the reactor to maintain the pressure at 160 psi (1.11 MPa). The ratio of HFP and VDF was maintained at 0.63 by weight, while the ratio of TFE and VDF was maintained at 1.83. After 6.5 hrs the monomer feeds were discontinued and the reactor was cooled. The resulting dispersion had a solid content of 17.2 wt % and a pH of 2.0. The mean particle size in the latex was 132 nm and the total amount of dispersion was about 3,271 g.

For the coagulation, 3000 g of the dispersion made as described above was added to 3038 g of a 1.25 wt % aqueous solution of $MgCl_2$. The crumb was recovered by filtering the coagulate through cheese cloth and gently squeezing to remove excess water. The crumb was returned to the coagulation vessel and rinsed with deionized water a total of 4 times. After the final rinse and filtration, the crumb was dried in a 130° C. oven for 16 hrs.

Polymerization Example 15-17

Polymerizations were carried out as in Example 14, except that the amount of "Sulfinate Monomer 1" was 11.0, 13.2, and 17.6 g, respectively. See Table 2.

Polymerization Example 18

A polymerization was carried out as in Example 14, with the exception that there was no "Sulfinate Monomer 1" in the recipe. In its place was a solution of the ammonium salt of an "Sulfinate Oligomer 1". Furthermore, the polymer dispersion (3000 g) was coagulated by adding it to 6300 g of a 4.8 wt % aqueous solution of $MgCl_2$. See Table 2.

Polymerization Example 19

A 4 liter reactor was charged with 2,590 g of water, 2 g of ammonium persulfate (APS, $(NH_4)_2S_2O_8$) with 50 g of water, 4 g of potassium phosphate dibasic ($K_2HPO_4$) with 50 g of water and a mixture of 6.3 g of 50% of "Sulfinate Oligomer 1" (0.0087 mol of $-SO_2H$ function) and 1.1 g of 28% $NH_4OH$. The mole ratio of the mixture was 1:1. The reactor was evacuated, the vacuum was broken and it was pressurized with nitrogen to 25 psi (0.17 MPa). This vacuum and pressurization was repeated three times. After removing oxygen, the reactor was heated to 80° C. and pressurized to 82 psi (0.51 MPa) with hexafluoropropylene (HFP). The reactor was then charged with vinylidene fluoride (VDF) and the hexafluoropropylene (HFP) bringing reactor pressure to 220 psi (1.52 MPa). Total precharge of VDF and HFP was 103 g, and 207 g, respectively. The reactor was agitated at 650 rpm. As reactor pressure dropped due to monomer consumption in the polymerization reaction, hexafluoropropylene (HFP) and VDF was continuously fed to the reactor to maintain the pressure at 220 psi (1.52 MPa). The ratio of HFP and VDF was 0.691 by weight. After 5.3 hrs the monomer feeds were discontinued and the reactor was cooled. The resulting dispersion had a solid content of 30.4 wt % and a pH of 4.0. The dispersion particle size was 83 nm and total amount of dispersion was about 3,959 grams.

For the coagulation, 3000 g of the dispersion made as described above was added to 6300 g of a 4.8 wt % aqueous solution of $MgCl_2$. The crumb was recovered by filtering the coagulate through cheese cloth and gently squeezing to remove excess water. The crumb was returned to the coagulation vessel and rinsed with deionized water a total of 4 times. After the final rinse and filtration, the crumb was dried in a 130° C. oven for 16 hours. The resulting fluoroelastomer raw gum had a Mooney viscosity of 181 at 121° C. The fluoroelastomer by FT-IR analysis contained 62.2 wt % copolymerized units of VDF and 37.8 wt % HFP. The fluorine content was 65.6 wt %. Mooney viscosity was determined in accordance with ASTM D1646-06 TYPE A by a MV 2000 instrument (available from Alpha Technologies, Akron, Ohio) using large rotor (ML 1+10) at 121° C. Results are reported in Mooney units.

Polymerization Example 20

In Polymerization Example 20, the fluoroelastomer was polymerized and tested as in Polymerization Example 19 except 12.6 g of 25% "Sulfinate Oligomer 4" aqueous solution was used instead of "Sulfinate Oligomer 1". After 7.2 hrs, the monomer feeds were discontinued and the reactor was cooled as in Polymerization Example 19. The resulting dispersion had a solid content of 13.5 wt. % and a pH of 4.0. The dispersion particle size was 118 nm and the total amount of dispersion was about 3,115 g. The resulting fluoroelastomer raw gum had a Mooney viscosity of 104 at 121° C. The fluoroelastomer by FT-IR analysis contained 60.2 wt % copolymerized units of VDF and 39.8 wt % HFP. The fluorine content was 66.0 wt %. The polymerization and test results are summarized in Table 2.

Polymerization Example 21

In Polymerization Example 21, the fluoroelastomer was polymerized and tested as in Polymerization Example 19 except 6.3 g of 50% "Sulfinate Oligomer 5" aqueous solution was used instead of "Sulfinate Oligomer 1". After 7.6 hrs, the monomer feeds were discontinued and the reactor was cooled as in Polymerization Example 19. The resulting dispersion had a solid content of 9.1 wt. % and a pH of 3.4. The dispersion particle size was 109 nm and total amount of dispersion was about 2,985 g. The resulting fluoroelastomer raw gum had a Mooney viscosity of 36 at 121° C. The fluoroelastomer by FT-IR analysis contained 55.8 wt % copolymerized units of VDF and 44.2 wt % HFP. The fluorine content was 66.7 wt %. The polymerization and test results are summarized in Table 2.

Polymerization Example 22

In Polymerization Example 22, the fluoroelastomer was polymerized and tested as in Polymerization Example 19 except 10.9 grams of 29% "Sulfinate Oligomer 6" aqueous solution was used instead of "Sulfinate Oligomer 1". After 5.3 hrs, the monomer feeds were discontinued and the reactor was cooled as in Polymerization Example 19. The resulting dispersion had a solid content of 12.9 wt. % and a pH of 3.6. The dispersion particle size was 86 nm and total amount of dispersion was about 3,101 g. The resulting fluoroelastomer raw gum had a Mooney viscosity of 49 at 121° C. The fluoroelastomer by FT-IR analysis contained 59.0 wt % copolymerized units of VDF and 41.0 wt % HFP. The fluorine content was 66.2 wt %. The polymerization and test results are summarized in Table 2.

Polymerization Example 23

In Polymerization Example 23, the fluoroelastomer was polymerized and tested as in Polymerization Example 19 except 6.3 g of 50% "Sulfinate Oligomer 7" aqueous solution was used instead of "Sulfinate Oligomer 1". After 5.4 hrs, the monomer feeds were discontinued and the reactor was cooled as in Polymerization Example 19. The resulting dispersion had a solid content of 32.1 wt % and a pH of 3.7. The dispersion particle size was 123 nm and the total amount of dispersion was about 3,953 g. The resulting fluoroelastomer raw gum had a Mooney viscosity of 196 at 121° C. The fluoroelastomer by FT-IR analysis contained 57.0 wt % copolymerized units of VDF and 43.0 wt % HFP. The fluorine content was 66.5 wt %. The polymerization and test results are summarized in Table 2.

Polymerization Comparative Example A

A polymerization was carried out as in Example 3, with the exception that ADONA was used in place of "Sulfinate Monomer 1". See Table 2.

Polymerization Comparative Example B

A polymerization was carried out as in Example 3, with the exception that no "Sulfinate Monomer 1" was used and no emulsifier at all was used in the polymerization. See Table 2.

Polymerization Comparative Example C

A polymerization was carried out as in Example 11, with the exception that there was no "Sulfinate Monomer 1" in the recipe. There was no surfactant used in this polymerization. See Table 2.

Polymerization Comparative Example D

A polymerization was carried out as in Example 11, with the exception that there was no "Sulfinate Monomer 1" in the recipe. In its place was a solution of ADONA. See Table 2.

Polymerization Comparative Example E

A polymerization was carried out as in Example 14, with the exception that there was no "Sulfinate Monomer 1" in the recipe. In its place was a solution of ADONA. The result of this polymerization was not a liquid dispersion, but rather a semi-solid paste. See Table 2.

Polymerization Comparative Example F

The fluoroelastomer was polymerized and tested as in Polymerization Example 19 except no "Sulfinate Oligomer 1" and $NH_4OH$ were used. After 2.9 hrs the monomer feeds were discontinued and the reactor was cooled as Polymerization Example 19. The resulting dispersion had a solid content of 31.5 wt % and a pH of 4.2. The dispersion particle size was 389 nm and total amount of dispersion was about 3,890 g. The resulting fluoroelastomer raw gum had a Mooney viscosity of 180° C. at 121° C. The fluoroelastomer by FT-IR analysis contained 60.7 wt % copolymerized units of VDF and 39.3 wt % HFP. The fluorine content was 65.9 wt %. The polymerization and test results are summarized in Table 2.

Polymerization Comparative Example G

The fluoroelastomer was polymerized and tested as in Polymerization Example 19 except 5.2 g of 48% aqueous solution C4 monosulfinate $C_4F_9SO_2H$ (0.0087 mol of $-SO_2H$ function), which is the mole equivalent amount as "Sulfinate Oligomer 1" in Polymerization Example 19, was used instead of "Sulfinate Oligomer 1". After 3.0 hrs the monomer feeds were discontinued and the reactor was cooled as Polymerization Example 20. The resulting dispersion had a solid content of 30.4 wt % and a pH of 3.4. The dispersion particle size was 573 nm and total amount of dispersion was about 3,898 g. The resulting fluoroelastomer raw gum had a Mooney viscosity of 162° C. at 121° C. The fluoroelastomer by FT-IR analysis contained 61.1 wt % copolymerized units of VDF and 38.9 wt % HFP. The fluorine content was 65.8 wt %. The polymerization and test results are summarized in Table 2.

Polymerization Comparative Example H

The fluoroelastomer was polymerized and tested as in Polymerization Example 19 except 1.23 g of C3 disulfinic acid $HO_2SC_3F_6SO_2H$ (0.0087 mol of $-SO_2H$ function), which is the mole equivalent amount as "Sulfinate Oligomer 1" in Polymerizatrion Example 19, was used instead of "Sulfinate Oligomer 1". After 3.0 hrs the monomer feeds were discontinued and the reactor was cooled as Polymerization Example 20. The resulting dispersion had a solid content of 31.5 wt % and a pH of 4.0. The dispersion particle size was 407 nm and total amount of dispersion was about 4,013 g. The resulting fluoroelastomer raw gum had a Mooney viscosity of 162 at 121° C. The fluoroelastomer by FT-IR analysis contained 60.7 wt % copolymerized units of VDF and 39.3 wt % HFP. The fluorine content was 65.9 wt %. The polymerization and test results are summarized in Table 2.

TABLE 1

| Conc (ppm) | M1[2] | M2 | O1[3] | O2 | O4 | O5 | O6 | O7 |
|---|---|---|---|---|---|---|---|---|
| 0 | 71.6[1] | 72.9 | 72.2 | 73.0 | 71.2 | 73.9 | 73.8 | 70.6 |
| 124 | 70.6 | 68.0 | 56.0 | 41.5 | 71.2 | 73.7 | 72.2 | 49.4 |
| 306 | 67.7 | 61.2 | 43.5 | 34.0 | 65.7 | 73.5 | 38.5 | 34.1 |
| 573 | 63.2 | 54.1 | 37.0 | 31.8 | 65.0 | 73.2 | 24.7 | 32.3 |
| 936 | 58.7 | 47.6 | 31.7 | 30.4 | 63.9 | 73.0 | 23.1 | 30.6 |
| 1403 | 54.1 | 42.1 | 29.4 | 29.7 | 61.7 | 72.3 | 22.1 | 29.2 |
| 1958 | 49.5 | 37.5 | 28.6 | 29.1 | 30.9 | 36.3 | 21.3 | 26.4 |
| 2556 | 44.3 | 34.1 | 27.7 | 28.7 | 23.9 | 25.1 | 21.0 | 24.6 |

[1] = all data is dynes/cm;
[2] = M1 is monomer 1, etc;
[3] = O1 is oligomer 1, etc

TABLE 2

| Example | *Emulsifier (wt %)* | Reaction time (min) | % solids | Particle size (nm) |
|---|---|---|---|---|
| 1 | O1 (0.037) | 248 | 33.4 | 50 |
| 2 | O3 (0.067) | 336 | 30.4 | 177 |
| 3 | M1 (0.11) | 180 | 31.0 | 127 |
| 4 | M1 (0.22) | 175 | 31.8 | 111 |
| 5 | M1 (0.28) | 166 | 33.9 | 141 |
| 6 | M1 (0.33) | 194 | 33.5 | 124 |
| 7 | M1 (0.44) | 159 | 33.3 | 122 |
| 8 | O1 (0.043) | 252 | 31.9 | 149 |
| 9 | M2 (0.080) | 193 | 33.3 | 117 |
| 10 | O2 (0.025) | 213 | 31.6 | 107 |
| 11 | M1 (0.33) | 178 | 33.6 | 57 |
| 12 | M1 (0.44) | 191 | 35.3 | 125 |
| 13 | O1 (0.025) | 227 | 33.7 | 124 |
| 14 | M1 (0.22) | 388 | 17.2 | 132 |
| 15 | M1 (0.28) | 271 | 21.3 | 78 |
| 16 | M1 (0.33) | 395 | 26.1 | 195 |
| 17 | M1 (0.44) | 356 | 26.0 | 123 |
| 18 | O1 (0.050) | 263 | 23.0 | 114 |
| 19 | O1 (0.083) | 315 | 30.4 | 83 |
| 20 | O4 (0.10) | 432 | 13.5 | 118 |
| 21 | O5 (0.11) | 453 | 9.1 | 109 |
| 22 | O6 (0.10) | 318 | 12.9 | 86 |
| 23 | O7 (0.08) | 326 | 32.1 | 123 |
| CE A | ADONA (0.11) | 233 | 32.5 | 343 |
| CE B | None | 234 | 30.7 | 338 |
| CE C | None | 246 | 34.6 | 407 |
| CE D | ADONA (0.050) | 394 | 31.8 | 385 |
| CE E | ADONA (0.025) | 362 | 38.5 | PASTE** |
| CE F | None | 173 | 31.5 | 389 |
| CE G | C$_4$F$_9$SO$_2$H (0.068) | 178 | 30.4 | 573 |
| CE H | HO$_2$SC$_3$F$_6$SO$_2$H (0.034) | 180 | 31.8 | 407 |

*all emulsifiers used were ammonium salts and % emulsifier was based on wt of final polymer dispersion
**agglomerated and no dispersion formed.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows and multi-layer articles created by this process.

What is claimed is:

1. Microemulsions comprising:
   (a) water;
   (b) at least one ethylenically unsaturated fluoromonomer; and
   (c) at least one oligomeric fluorosulfinic compound is selected from the group consisting of oligomeric fluorosulfinic compounds comprising repeating units of formula
   (i) highly fluorinated sulfinate oligomer having the following formula (IV):

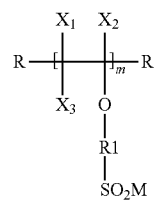

wherein $X_1$, $X_2$, and $X_3$ are independently selected from F, Cl and $CF_3$; R is independently selected from H, I, Br, linear or branched alkyl, and linear or branched fluoroalkyl group, optionally containing heteroatoms; R1 is a linear or branched perfluorinated linking group, which may be saturated or unsaturated, substituted or unsubstituted, and optionally comprises catenary heteroatoms; M is a cation; and m is at least 2;

(ii) a partially fluorinated sulfinate oligomer comprising repeating units of the following formula (VI)

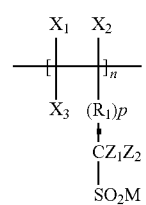

wherein $X_1$, $X_2$, and $X_3$ are independently selected from H, F, Cl, Br, I, $CF_3$, and $CH_3$ and wherein at least one of $X_1$, $X_2$, or $X_3$ is H; $R_1$ is a linking group, $Z_1$ and $Z_2$ are independently selected from Br, Cl, I, F, $CF_3$, and a perfluoroalkyl group; M is a cation; p is 0 or 1; and n is at least 2.

2. Microemulsions according to claim 1 wherein the oligomeric fluorosulfinic compound is a highly fluorinated sulfinate oligomer.

3. Microemulsions according to claim 1 further comprising salts derived from the highly fluorinated sulfinate oligomer.

4. Microemulsions comprising:
   (a) water;
   (b) at least one ethylenically unsaturated fluoromonomer;
   (c) at least one oligomeric fluorosulfinic compound; wherein the oliqomeric fluorosulfinic compound further comprises at least one second unit selected from the group consisting of:

(i) repeating units of formula (II):

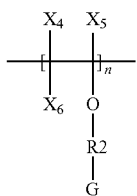

wherein $X_4$, $X_5$, or $X_6$ are independently selected from H, F, Cl and $CF_3$; R2 is a linear or branched fluorinated linking group, which may be saturated or unsaturated and substituted or unsubstituted, and optionally comprises a heteroatom; G is selected from a perfluoroalkyl and a functional group; n is at least 1; and (ii) repeating units of the following formula:

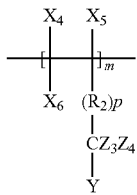

wherein $X_4$, $X_5$, and $X_6$ are independently selected from H, F, Cl, Br, I $CF_3$, and $CH_3$; R2 is a linking group; $Z_3$ and $Z_4$ are independently selected from Br, Cl, F, $CF_3$, and a perfluoroalkyl group; Y is selected from —H, —Br, —COOM, —$SO_3$M, and —$[CX_1X_3-CX_2(R_1CZ_1Z_2Y_1)]_q$, a linear or branched, fluorinated group, which may be saturated or unsaturated and substituted or unsubstituted, and optionally comprises a heteroatom; where $Y_1$ is selected from —H, —Br, —COOM, —$SO_3$M, —$SO_2$M, and —$[CX_1X_3-CX_2(R_1CZ_1Z_2Y_1)]_q$; $Z_1$ and $Z_2$ are independently selected from Br, Cl, I, F, $CF_3$, and a perfluoroalkyl group; M is an organic cation; p is 0 or 1; and m is at least 1 and q is at least 1.

5. Microemulsions according to claims 4 wherein the functional group G is an alcohol derivative.

6. Microemulsions according to claim 1 wherein the at least one oligomeric fluorosulfinic compound further comprises a monomer to provide a structure according to formula (III):

wherein Z is derived from monomers selected from ethylene, propylene, tetrafluoroethylene, chlorotrifluoroethylene, hexafluoropropylene, vinylidene fluoride, vinyl fluoride, fluorinated alkyl vinyl ethers, fluorinated alkoxy vinyl ethers, fluorinated vinyl containing a functional group, perfluoro-1,3-dioxoles, and combinations thereof, and further wherein p is at least one.

7. Microemulsions according to claim 1 wherein R1 are independently selected from: —$(CF_2)_a$—, —$(CF_2)_a$—O—$(CF_2)_b$—, —$(CF_2)_a$—[O—$(CF_2)_b]_c$—, —$(CF_2)_a$—[O—(CF($CF_3$)$CF_2)_b]_c$—, and —$[(CF_2)_a$—O—$]_b$—$[(CF_2)_c$—O—$]_d$—, and combinations thereof, wherein a, b, c, and d are independently at least 1.

8. Microemulsions according to claim 1 wherein R1 are independently selected from: —$CF_2CF_2$—, —$CF_2CF_2CF_2CF_2$—, —$CF_2CF_2OCF_2CF_2$—, —$CF_2CF(CF_3)$—O—$CF_2CF_2$—.

9. Microemulsions according to claim 1 wherein the at least one oligomeric fluorosulfinic compound has a number average molecular weight of no more than 20,000 grams/mole.

10. Microemulsions according to claim 1 wherein M is selected from: $H^+$, $NH_4^+$, $PH_4^+$, $H_3O^+$, $Na^+$, $Li^+$, $Cs^+$, $Ca^{+2}$, $K^+$, $Mg^{+2}$, $Zn^{+2}$, and $Cu^{+2}$, and/or an organic cation including, but not limited to $N(CH_3)_4^+$, $NH_2(CH_3)_2^+$, $N(CH_2CH_3)_4^+$, $NH(CH_2CH_3)_3^+$, $NH(CH_3)_3^+$, $((CH_3CH_2CH_2CH_2)_4)P^+$, and combinations thereof.

11. Microemulsions according to claim 1, wherein the at least one oligomeric fluorosulfinic compound is water soluble.

12. Microemulsions according to claim 4 wherein the functional group G is selected from carboxylic acids and derivatives thereof, nitriles, sulfonyl halides, sulfonates, imidates, amidines, alcohols, mercaptans, and combinations thereof.

* * * * *

UNITED STATES PATENT AND TRADEMARK OFFICE
CERTIFICATE OF CORRECTION

Page 1 of 3

PATENT NO. : 9,212,279 B2
APPLICATION NO. : 13/994900
DATED : December 15, 2015
INVENTOR(S) : Tatsuo Fukushi It is certified that error appears in the above-identified patent and that said Letters Patent is hereby corrected as shown below:

IN THE SPECIFICATION

Column 3
Line 58, Delete "XYXYXY—" and insert -- —XYXYXY— --, therefor.
Line 58, Delete "YXXYXY—." and insert -- —YXXYXY—. --, therefor.

Column 4
Line 49, Delete "caternary heteratoms." and insert -- catenary heteroatoms. --, therefor.

Column 6
Line 64, Delete "oliogomeric" and insert -- oligomeric --, therefor.

Column 9
Line 32, Delete "hyrdoperoxides," and insert -- hydroperoxides, --, therefor.

Column 10
Line 42, Delete "trisobutyl" and insert -- triisobutyl --, therefor.
Line 59, Delete "monooxide," and insert -- monoxide, --, therefor.

Column 11
Line 35 (Approx.), Delete "$CX_2(R_1CZ_1Z_2Y_1)]q$," and insert -- $CX_2(RiCZ_1Z_2Y_1)]q$, --, therefor.

Column 12
Line 49, Delete "$CH_2$—CF—" and insert -- $CH_2$=CF— --, therefor.
Line 50, Delete "$CH_2$—CH—" and insert -- $CH_2$=CH— --, therefor.
Line 50, Delete "$CH_2$—CH—" and insert -- $CH_2$=CH— --, therefor.
Line 51, Delete "$CH_2$—CH—" and insert -- $CH_2$=CH— --, therefor.
Line 56, Delete "$CH_2$—CH—" and insert -- $CH_2$=CH— --, therefor.
Line 56, Delete "$CH_2$—CH—" and insert -- $CH_2$=CH— --, therefor.

Signed and Sealed this
Nineteenth Day of April, 2016

Michelle K. Lee
*Director of the United States Patent and Trademark Office*

Line 57, Delete "CH$_2$—CH—" and insert -- CH$_2$=CH— --, therefor.
Line 57, Delete "CH$_2$—CH—" and insert -- CH$_2$=CH— --, therefor.
Line 58, Delete "CH$_2$—CH—" and insert -- CH$_2$=CH— --, therefor.
Line 58, Delete "CH$_2$—CH—" and insert -- CH$_2$=CH— --, therefor.
Line 58, Delete "SO2Li," and insert -- SO$_2$Li, --, therefor.
Line 59, Delete "CH$_2$—CH—" and insert -- CH$_2$=CH— --, therefor.
Line 59, Delete "CH$_2$—CH—" and insert -- CH$_2$=CH— --, therefor.
Line 60, Delete "CH$_2$—CH—" and insert -- CH$_2$=CH— --, therefor.
Line 63, Delete "CH$_2$—CH—" and insert -- CH$_2$=CH— --, therefor.
Line 63, Delete "CH$_2$—CH—" and insert -- CH$_2$=CH— --, therefor.
Line 65, Delete "SO2K," and insert -- SO$_2$K, --, therefor.

Column 14
Line 16, Delete "Ω-halofluorosulfonylfluoride" and insert -- ω-halofluorosulfonylfluoride --, therefor.

Column 19
Line 1, Delete "-alkali-" and insert -- - alkali- --, therefor.

Column 20
Line 7, Delete "iodo-(per)" and insert -- iodo- (per) --, therefor.

Column 23
Line 46, Delete "X$_i$," and insert -- X$_1$, --, therefor.

Column 24
Line 7, Delete "(R$_i$CZ$_1$Z$_2$Y$_1$)]q;" and insert -- (R$_1$CZ$_1$Z$_2$Y$_1$)]q; --, therefor.

Column 28
Line 30, Delete "2NH$_2$SO$_4$" and insert -- 2N H$_2$SO$_4$ --, therefor.

Column 29
Line 40, Delete "convesion" and insert -- conversion --, therefor.

Column 31
Line 20, Delete "~130 ppm" and insert -- ~-130 ppm --, therefor.
Line 38, Delete "2NH$_2$SO$_4$" and insert -- 2N H$_2$SO$_4$ --, therefor.

Column 39
Line 1, Delete "Polymerizatrion" and insert -- Polymerization --, therefor.

IN THE CLAIMS

Column 40
Line 12-15, In Claim 1, delete "compound is selected from the group
consisting of oligomeric fluorosulfinic compounds comprising repeating units of formula" and insert -- compound. --, therefor.
Line 65, In Claim 4, delete "oliqomeric" and insert -- oligomeric --, therefor.

Column 41
Line 31 (Approx.), In Claim 4, delete "I CF$_3$," and insert -- I,CF$_3$, --, therefor.
Line 35 (Approx.), In Claim 4, delete "branched," and insert -- branched --, therefor.
Line 41 (Approx.), In Claim 4, delete "CF$_3$,and" and insert -- CF$_3$, and --, therefor.
Line 44 (Approx.), In Claim 5, delete "claims" and insert -- claim --, therefor.

Column 42
Line 17, In Claim 7, delete "R1 are" and insert -- R1 and R2 are --, therefor.